United States Patent
Jasinski et al.

(10) Patent No.: US 10,584,033 B2
(45) Date of Patent: Mar. 10, 2020

(54) METHODS FOR SYNTHESIZING CARBON NANOCAGES

(71) Applicant: UNIVERSITY OF LOUISVILLE RESEARCH FOUNDATION, INC., Louisville, KY (US)

(72) Inventors: Jacek B. Jasinski, Louisville, KY (US); Dominika A. Ziolkowska, Warsaw (PL); Gamini U. Sumanasekera, Louisville, KY (US); John Samuel Dilip Jangam, Louisville, KY (US); Bijandra Kumar, Louisville, KY (US)

(73) Assignees: University of Louisville Research Foundation, Inc., Louisville, KY (US); Uniwersytet Warszawski, Warsaw (PL)

( * ) Notice: Subject to any disclaimer, the term of this patent is extended or adjusted under 35 U.S.C. 154(b) by 0 days.

(21) Appl. No.: 15/760,083

(22) PCT Filed: Sep. 14, 2016

(86) PCT No.: PCT/US2016/051730
§ 371 (c)(1),
(2) Date: Mar. 14, 2018

(87) PCT Pub. No.: WO2017/048837
PCT Pub. Date: Mar. 23, 2017

(65) Prior Publication Data
US 2018/0257940 A1    Sep. 13, 2018

Related U.S. Application Data

(60) Provisional application No. 62/218,332, filed on Sep. 14, 2015.

(51) Int. Cl.
*C01B 32/15*    (2017.01)
*B82Y 30/00*    (2011.01)
(Continued)

(52) U.S. Cl.
CPC ............. *C01B 32/15* (2017.08); *B01J 13/04* (2013.01); *B01J 13/203* (2013.01); *B82Y 30/00* (2013.01);
(Continued)

(58) Field of Classification Search
CPC .......... C01B 32/15; B01J 13/04; B82Y 30/00; B82Y 40/00; C01P 2004/04;
(Continued)

(56) References Cited

U.S. PATENT DOCUMENTS

2003/0086860 A1    5/2003    Uehara et al.
2012/0099244 A1    4/2012    Lee et al.

FOREIGN PATENT DOCUMENTS

| CN | 103183330 A | * | 7/2013 |
| CN | 103183341 A | * | 7/2013 |
| CN | 103357433 |   | 4/2015 |

OTHER PUBLICATIONS

Tan, Yueming, et al. "Synthesis of ultrathin nitrogen-doped graphitic carbon nanocages as advanced electrode materials for supercapacitor." ACS applied materials & interfaces 5.6 (2013): 2241-2248.*
(Continued)

*Primary Examiner* — Richard M Rump
(74) *Attorney, Agent, or Firm* — Jenkins, Wilson, Taylor & Hunt, P.A.

(57) ABSTRACT

A method for synthesizing carbon nanocages, including N-doped carbon nanocages, includes a first step of forming a solution including a metal salt and an organic carbon source; a second step of drying the solution to obtain a precursor powder; and a third step of annealing the precursor powder to obtain a nanocage including a metal nanoparticle surrounded by a carbon shell. The metal nanoparticle is then removed from the carbon shell by applying an acid solution.

32 Claims, 23 Drawing Sheets

(51) Int. Cl.
*B82Y 40/00* (2011.01)
*B01J 13/04* (2006.01)
*B01J 13/20* (2006.01)

(52) U.S. Cl.
CPC .......... *B82Y 40/00* (2013.01); *C01P 2004/04* (2013.01); *C01P 2004/34* (2013.01); *C01P 2004/64* (2013.01); *C01P 2006/12* (2013.01); *C01P 2006/17* (2013.01); *Y10S 977/735* (2013.01); *Y10S 977/842* (2013.01)

(58) Field of Classification Search
CPC .............. C01P 2004/34; C01P 2004/64; C01P 2006/12; C01P 2006/17; C01P 2006/03; Y10S 977/735; Y10S 977/842
See application file for complete search history.

(56) References Cited

OTHER PUBLICATIONS

Huang, Yu'an, et al. "Preparation, characterization, and surface modification of carbon-encapsulated nickel nanoparticles." The Journal of Physical Chemistry C 113.16 (2009): 6533-6538.*
Simon, P., et al., Materials for electrochemical capacitors. Nature Materials, 2008. 7(11): p. 845-854.
Staaf, L.G.H. et al. Present and future supercapacitor carbon electrode materials for improved energy storage used in intelligent wireless sensor systems. Nano Energy, 2014. 9: p. 128-141.
Xie, K., et al., Carbon Nanocages as Supercapacitor Electrode Materials. Advanced Materials, 2012. 24(3): p. 347-352.
Zhu Y. et al. Carbon-Based Supercapacitors Produced by Activation of Graphene. Science, 2011. 332(6037): p. 1537-1541.
Miller, J.R., et al., Graphene Double-Layer Capacitor with ac Line-Filtering Performance. Science, 2010. 329(5999): p. 1637-1639.
Miller, J.R., et al., Materials science—Electrochemical capacitors for energy management. Science, 2008. 321 (5889): p. 651-652.
Futaba, D.N., et al., Shape-engineerable and highly densely packed single-walled carbon nanotubes and their application as supercapacitor electrodes. Nature Materials, 2006. 5(12): p. 987-994.
Xu, B., et al., Competitive effect of KOH activation on the electrochemical performances of carbon nanotubes for EDLC: Balance between porosity and conductivity. Electrochimica Acta, 2008. 53(26): p. 7730-7735.
Ruiz, V., et al., An activated carbon monolith as an electrode material for supercapacitors. Carbon, 2009. 47(1): p. 195-200.
Gryglewicz, G., et al., Effect of pore size distribution of coal-based activated carbons on double layer capacitance. Electrochimica Acta, 2005. 50(5): p. 1197-1206.
Wang, K, et al., Mesoporous Carbon Nanofibers for Supercapacitor Application. Journal of Physical Chemistry C, 2009. 113(3): p. 1093-1097.
Xu, B., et al., Highly mesoporous and high surface area carbon: A high capacitance electrode material for EDLCs with various electrolytes. Electrochemistry Communications, 2008. 10(5): p. 795-797.
Xing, W., et al., Superior electric double layer capacitors using ordered mesoporous carbons. Carbon, 2006.44(2): p. 216-224.
Stoller, M.D., et al., Graphene-Based Ultracapacitors. Nano Letters, 2008. 8(10): p. 3498-3502.
Wang, Y., et al., Supercapacitor Devices Based on Graphene Materials. Journal of Physical Chemistry C, 2009. 113(30): p. 13103-13107.
Zhang, L.L., et al., Graphene-based materials as supercapacitor electrodes. Journal of Materials Chemistry, 2010. 20 (29): p. 5983-5992.
Wang, X.X., et al., Carbon nanocages: A new support material for Pt catalyst with remarkably high durability. Scientific Reports, 2014. 4: p. 4437.

Chen, S., et al., Nitrogen-Doped Carbon Nanocages as Efficient Metal-Free Electrocatalysts for Oxygen Reduction Reaction. Advanced Materials, 2012. 24(41): p. 5593-5597.
Wang, W., et al., Mesoporous carbon originated from non-permanent porous MOFs for gas storage and CO2/CH4 separation. Scientific Reports, 2014. 4: p. 5711.
Li, G., et al., Synthesis, characterization and application of carbon nanocages as anode materials for high-performance lithium-ion batteries, RSC Advances, 2012. 2: p. 284-291.
Ma, Y., et al., A practical route to the production of carbon nanocages, Carbon, 2005. 43(8):p. 1667-1672.
Mitchell, D.R.G., DiffTools: Electron diffraction software tools for DigitalMicrograph (TM). Microscopy Research and Technique, 2008. 71(8): p. 588-593.
Lochel, B.P., et al., Breakdown of Passivity of Nickel by Floride II. Surface Analytical Studies. Journal of the Electrochemical Society, 1984. 131(4): p. 713-723.
Mansour, A.N., Nickel Monochromated Al Kα XPS Spectra from the Physical Electronics Model 5400 Spectrometer. Surface Science Spectra, 1994. 3(3): p. 221-230.
Mohamed, M.A., et al., Nonisothermal Decomposition of Nickel acetate Tetrahydrate. Journal of Analytical and Applied Pyrolysis, 1993.27(2): p. 109-118.
Baraton, L., et al., On the mechanisms of precipitation of graphene on nickel thin films, 2011. Europhysics letters, 2011. 96 (46003): p. 1-5.
Oya, A., et al., Catalytic Graphitization of Carbons by Various Metals, Carbon, 1979. 17(2): p. 131-137.
Baldan, A., Review Progress in Ostwald ripening theories and their applications to nickel-base superalloys Part I: Ostwald ripening theories ,Journal of Materials Science, 2002. 37(11): p. 2171-2202.
Pacley, S.D., Investigation of the behavior of the nickel catalyst in chemical vapor deposition synthesis of carbon nanopearls, Ph.D. Theses, University of Dayton, 2012.
Bokhonov, B., et al., The formation of graphite encapsulated metal nanoparticles during mechanical activation and annealing of soot with iron and nickel. Journal of Alloys and Compounds, 2002. 333(1-2): p. 308-320.
Tuinstra, F., et al., Raman Spectrum of Graphite, The Journal of Chemical Physic. 1970. 53: p. 1126-1130.
Nemanich, R.J., et al., First- and second-order Raman scattering from finite-size crystals of graphite, Physical Review B., 1979. (20): p. 392-401.
Hawaldar, R., et al., Large-area high-throughput synthesis of monolayer graphene sheet by Hot Filament Thermal Chemical Vapor Deposition, Scientific Reports 2, 2012.(682):p. 1-9.
Thomsen, C., et al., Double Resonant Raman Scattering in Graphite, Physical Review Letters, 2000. (85):p. 5214-5217.
Kawashim, Y., et al., Fundamentals, overtones, and combinations in the Raman spectrum of graphite, Physical Review B Condensed Matter, 1995. 52(14):p. 10053-10059.
Reich, S., et al., Raman spectroscopy of graphite, Phil. Trans. R. Soc. Lond. A 362 (2004) 2271-2288.
Pimenta, M.A., Studying disorder in graphite-based systems by Raman spectroscopy, Physical Chemistry Chemical Physics, 2007. (9):p. 1276-1291.
Dresselhaus, M.S., Characterizing Graphene, Graphite, and Carbon Nanotubes by Raman Spectroscopy, Annual Review of Condensed Matter Physics, 2010. (1):p. 89-108.
Ferrari, A.C., et al., Raman spectroscopy of amorphous, nanostructured, diamond-like carbon, and nanodiamond, Phil. Trans. R. Soc. Lond. A 2004 362, 2477-2512.
Ferrari, A.C., Raman spectroscopy of graphene and graphite: Disorder, electron-phonon coupling, doping and nonadiabatic effects, Solid State Communications, 2007. (143):p. 47-57.
Jiang, G., et al., TiO2 nanoparticles assembled on graphene oxide nanosheets with high photocatalytic activity for removal of pollutants, Carbon, 2011. (49): p. 2693-2701.
Wei, A., et al., Synthesis of high-performance graphene nanosheets by thermal reduction of graphene oxide, Materials Research Bulletin, 2011.(46):p. 2131-2134.
Podila, R., Raman Spectroscopy of Folded and Scrolled Graphene, ACS Nano, 2012. (6):p. 5784-5790.

(56) References Cited

OTHER PUBLICATIONS

Li, G. et al., General synthesis of carbon nanocages and their adsorption of toxic compounds from cigarette smoke, Nanoscale, 2011. 3(8):p. 3251-3257.
Tan, Y., et al., Synthesis of ultrathin nitrogen-doped graphitic carbon nanocages as advanced electrod materials for supercapacitor. ACS Appl Mater Interfaces, 2013. 5(6): p. 2241-2248.
Li, Z., et al., Supercritical Fluid Growth of Porous Carbon Nanocages. Chemistry of Materials, 2007. 19(13): p. 3349-3354.
Tsai, C.K., et al., Preparation of hollow spherical carbon nanocages. Journal of Nanoparticle Research, 2012. 14(12).
Zou, X.X., et al., Noble metal-free hydrogen evolution catalysts for water splitting. Chemical Society Reviews, 2015. 44(15): p. 5148-5180.
Wang, H.B., et al., Review on Recent Progress in Nitrogen-Doped Graphene: Synthesis, Characterization, and Its Potential Applications. Acs Catalysis, 2012. 2(5): p. 781-794.
Deng, Y.F., et al., Review on recent advances in nitrogen-doped carbons: preparations and applications in supercapacitors. Journal of Materials Chemistry A, 2016. 4(4): p. 1144-1173.
Shao, Y.Y., et al., Nitrogen-doped carbon nanostructures and their composites as catalytic materials for proton exchange membrane fuel cell. Applied Catalysis B-Environmental, 2008. 79(1-2): p. 89-99.
Zhang, J., et al., Carbon-based electrocatalysts for advanced energy conversion and storage. Science Advances, 2015. 1(7).
Kumar, B., et al., Renewable and metal-free carbon nanofibre catalysts for carbon dioxide reduction. Nature Communications, 2013. 4.
Zhang, C.H., et al., Synthesis of Nitrogen-Doped Graphene Using Embedded Carbon and Nitrogen Sources. Advanced Materials, 2011. 23(8): p. 1020-1024.
LV, R., et al., Nitrogen-doped graphene: beyond single substitution and enhanced molecular sensing. Scientific Reports, 2012. 2.
U.S. Patent and Trademark Office, International Search Report and Written Opinion issued in corresponding Application No. PCT/US16/51730, dated Dec. 12, 2016.
Chaudhari, N.K., et al., Heteroatom-doped highly porous carbon from human urine. Scientific Reports, 2014. vol. 4: p. 4-5, 8.
Kante, K., et al., Spent coffee-based activated carbon: specific surface features and their importance for H2S separation process. Journal of Hazardous Materials, 2011. vol. 201: p. 142-147.
The International Bureau of WIPO, International Preliminary Report on Patentability issued in corresponding Application No. PCT/US16/51730, dated Mar. 20, 2018.
Andrea Carlo Ferrari and John Robertson, Raman spectroscopy of amorphous, nanostructured, diamond-like carbon, nanodiamond, Phil. Trans. R. Soc. Lond. A 2004 362, 2477-2512.
Dresselhaus, M. S., A. Jorio, and R. Saito, Characterizing Graphene, Graphite, and Carbon Nanotubes by Raman Spectroscopy. Annual Review of Condensed Matter Physics, vol. 1, 2010. 1: p. 89-108.

\* cited by examiner

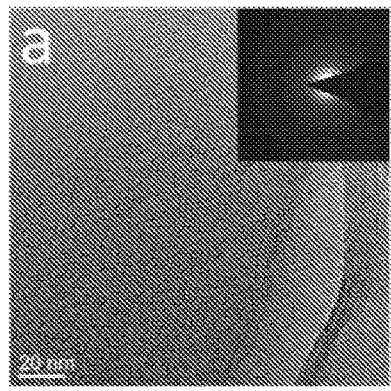 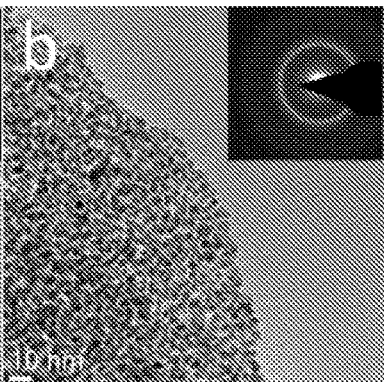 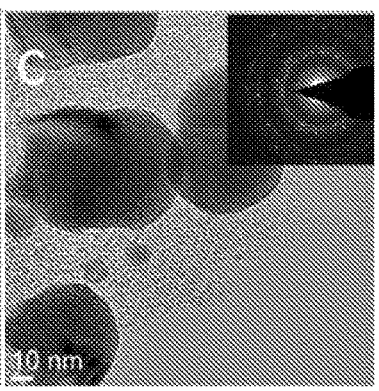
FIG. 11A　　FIG. 11B　　FIG. 11C
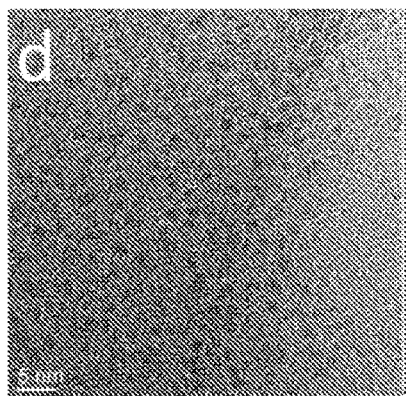 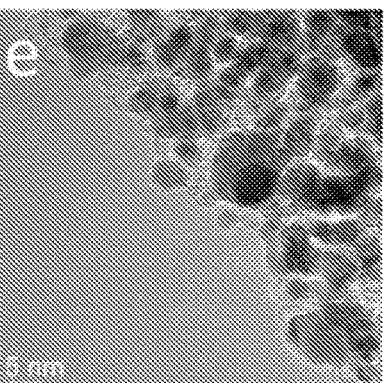 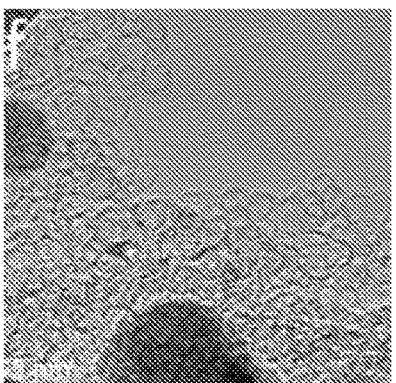
FIG. 11D　　FIG. 11E　　FIG. 11F

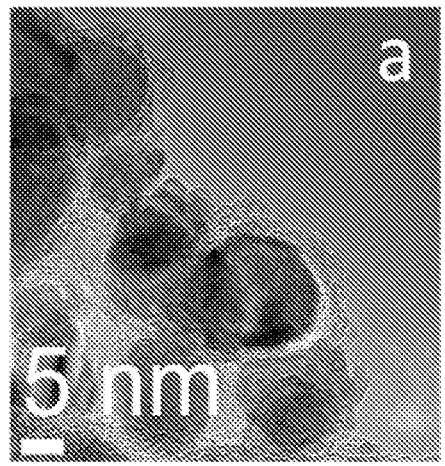 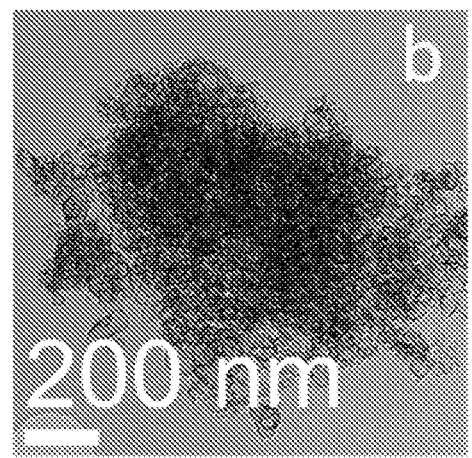
FIG. 17A  FIG. 17B
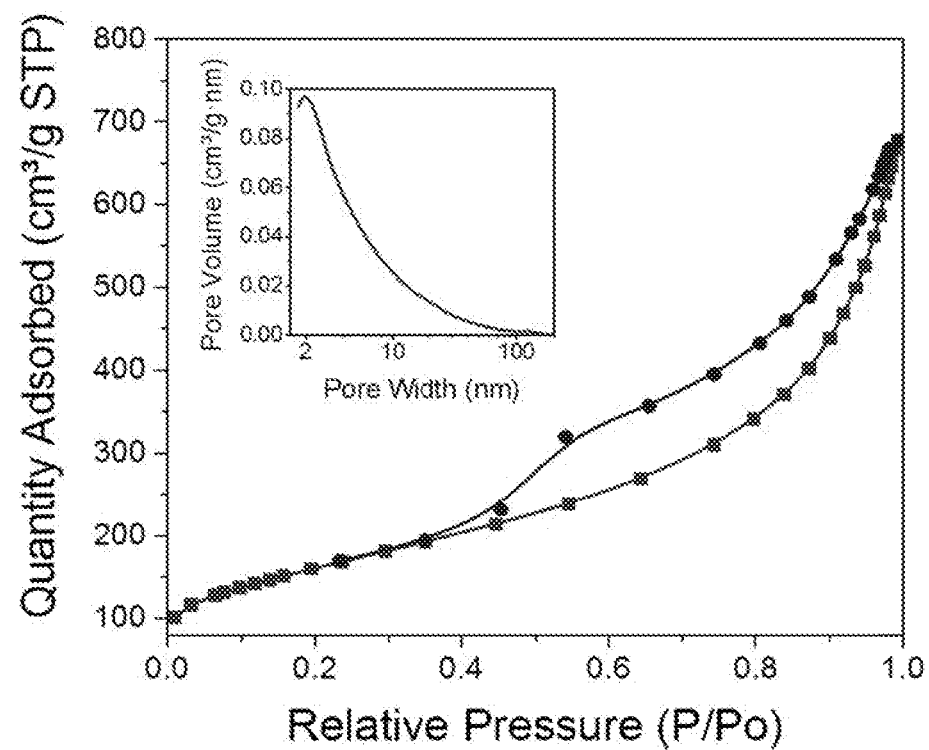
FIG. 17C

METHODS FOR SYNTHESIZING CARBON NANOCAGES

RELATED APPLICATIONS

This application claims priority to U.S. Provisional Application No. 62/218,332, filed Sep. 14, 2015, the entire disclosure of which is incorporated herein by this reference.

GOVERNMENT INTEREST

This invention was made with government support under grant no. 3048111570-15-016 awarded by the National Science Foundation. The government has certain rights in the invention.

TECHNICAL FIELD

The presently-disclosed subject matter relates to methods for synthesizing carbon nanocages. In particular, the presently-disclosed subject matter relates to methods for synthesizing carbon nanocages whereby a precursor powder formed from a metal salt and an organic carbon source is annealed in a carrier gas or a vacuum to obtain a carbon nanocage.

BACKGROUND

Carbon with its electron configuration of $[He]2s^2 2p^2$ and unrivaled ability to form different hybridization states, i.e., sp, $sp^2$, $sp^3$ or their mixtures, can exist in various allotrope forms (e.g., diamond, graphite, graphene, carbon nanotubes, etc.), with many of the forms possessing unique sets of properties. Diamond and graphite are some of the best known examples. Yet, while diamond consists of sp'-hybridized carbon atoms and strong covalent bonds, graphite exhibits a highly anisotropic layer structure, with honeycomb-like atomic planes of strongly-bonded $sp^2$ hybridized carbon atoms and very weak van der Waals interactions between the planes. Indeed, a single layer of graphite known as graphene is yet another allotrope of carbon that possesses various superior characteristics.

Among well-known carbon allotropes are also fullerenes, the simplest one being $C_{60}$, a nanosphere approximately 1 nm in diameter and consisting of 60 carbon atoms, each covalently bonded to its three neighbors. Carbon nanotubes (buckytubes) are elongated cylindrical fullerenes characterized by high aspect ratio and nanometer-sized diameters. As such, carbon nanoshells are attractive for applications in the areas of catalysis, energy technologies, and bio-medical fields. However, fullerenes are often too small for many desired applications, containment of drug molecules being one of them. There have been attempts to make larger carbon nanoshells, but the attempts have been met with limited success due to the relatively poor controllability of the number of layers, size, and the coalescence of the shells.

Related to fullerenes are also carbon nanocages (CNCs) which are a type of spherical nanocarbon with graphitic shells. While typical fullerenes exist primarily as isolated nanostructures, carbon nanocages may form a three-dimensional (3D) network, where individual hollow single- or few-layer nanoshells are interconnected to form large-scale structures, sometimes even in the millimeter or centimeter scale. Thus, in recent years, carbon nanocages have attracted significant attention due to their unique properties and promising applications.

With respect to the possible applications, because of their highly porous structure, carbon nanocages are considered for gas separation as membrane materials and also, due to their considerable pore volume, for gas storage and biomedical applications, including drug delivery systems. Furthermore, because of high open surface area, carbon nanocages are also, similarly to other 3D meso- and nanoporous carbons, promising materials for sensing, catalysts and catalysts supports, as well as for electrodes for energy storage devices. In fact, one of the promising applications of carbon nanocages is to use carbon nanocages as electrode materials in supercapacitors, electrochemical storage devices that exhibit high power capabilities and play a key role in the development of several important technologies, including electric transportation, energy management systems, and intelligent wireless sensors systems.

Various carbons, such as carbon nanotubes, activated carbon, mesoporous carbon, and graphene, have been demonstrated as promising supercapacitor electrode materials. Owing to their high surface area, however, carbon nanocages are particularly suitable for the use in electrochemical double layer supercapacitors (EDLS), which utilize the energy storage mechanism based on the physical adsorption of charges at the electrode-electrolyte interface. Carbon nanocages can also be used in so-called pseudocapacitors because, similar to other carbonaceous materials, carbon nanocages can be doped with nitrogen, which results in additional charge storage capability, known as pseudocapacity. Application of carbon nanocages in so-called hybrid supercapacitors, where one electrode is based on electrochemical double layer capacity and the other one on pseudocapacity, can lead to a further increase, even doubling in optimal cases, of the effective capacity.

Recently, nitrogen-doped carbon nanostructures (e.g., carbon nanotube, carbon nanofibers) were further examined for different electrochemical reactions including $CO_2$ reduction, oxygen reduction, and hydrogen evolution reactions (HER). HER, a cathodic half reaction of water splitting, is an electrochemical reaction where protons are reduced to form hydrogen. Thermodynamically, the reaction takes place at 0.0 V versus a NHE (normal hydrogen electrode) at pH=0. However, additional energy is needed to surmount a certain activation energy barrier (known as overpotential) to occur. Therefore, electrocatalysts are essential to lower the overpotential, and consequently promote the reaction rate and efficiency. The kinetics and onset potential for HER is governed by the intrinsic properties of the electrocatalysts.

For commercial application, the HER catalysts must hold the following key characteristics: high catalytic activity; long term durability; low price; and stability in different electrolytes. Theoretical and experimental studies have confirmed that among HER catalysts, noble metals (e.g., Pt, Pd etc.) are some of the most active and Pt is the most efficient and capable to drive HER at the lowest potential. For instance, 10 $mA/cm^2$ current can be attained for a Pt electrode at as low as 0.1 V vs RHE working cathodic potential in acidic condition (pH 1). However, due to its high price and poor stability in the presence of contamination (e.g., $CO_2$), Pt is not an ideal candidate for commercial applications using electrolysis hydrogen generation for renewable energy storage. Metal-free catalysts are inexpensive and possess significantly high catalytic activity and strongly compete with noble metal catalysts and even surpass their activity in case of $CO_2$ electrochemical reduction. However, the development of N-doped carbon nanostructures (e.g., carbon nanotube and graphene) has been a complex process due to an additional nitrogen atom insertion step, requirement of high temperature and pressure, and poor control over doping level and physical properties (e.g., size, conductivity, etc.) of nanostructures.

To date, several synthesis methods have been proposed to obtain carbon nanocages. Some investigators have used spray pyrolysis of iron carbonyl and a carbon precursor, including N-containing carbon precursors for in situ fabrication of N-doped carbon nanocages, and have produced nanocages and used the nanocages as support for a Pt catalyst with remarkable catalytic activity and stability towards hydrogen oxidation reaction (HOR) and oxygen reduction reaction (ORR). Recently, others have demonstrated that N-doped carbon nanocages alone can also serve as efficient and stable metal-free ORR electrocatalysts. Such catalysts showed excellent performance compared to commercial Pt/C electrocalatysts and also exhibited high stability towards methanol crossover and CO poisoning. The N-doped nanocages used, have been obtained by in situ MgO template method with pyridine as the precursors. In previous studies, investigators have demonstrated analogous methods based on a benzene precursor. Still others have prepared carbon nanocages using an in situ MgO template method and have demonstrated excellent properties for supercapacitor electrode materials. Recently, certain investigators have used direct carbonization of non-permanent highly porous MOFs to obtain nanoporous carbons with high surface area and good physicochemical stability. Further investigators have synthesized carbon nanocages using nickel oxalate and citric acid in a stainless-steel autoclave at 550° C. Although the nanocages were of 200-500 nm diameter, electrochemical performance was reported to improve only after annealing at 600° C. for 5 h. Additional groups have used laser-induction complex heating evaporation to produce carbon-coated iron nanoparticles (5-50 nm) with a few layers of graphitic shells, and have indicated the same process can be extended to other metals such as Ni and Co for synthesis of nanocages.

To date, however, and for many applications, there still remains a need for methods that allow carbon shells to be fabricated with determined size, number of layers, and desired dispersion. A simple, scalable process that can utilize less expensive materials in a shorter time frame would also aid in commercialization efforts for nanocage applications.

SUMMARY

The presently-disclosed subject matter meets some or all of the above-identified needs, as will become evident to those of ordinary skill in the art after a study of information provided in this document.

This summary describes several implementations of the presently-disclosed subject matter, and in many cases lists variations and permutations of these implementations. This summary is merely exemplary of the numerous and varied implementations. Mention of one or more representative features of a given implementation is likewise exemplary. Such an implementation can typically exist with or without the feature(s) mentioned; likewise, those features can be applied to other implementations of the presently-disclosed subject matter, whether listed in this summary or not. To avoid excessive repetition, this summary does not list or suggest all possible combinations of such features.

In some implementations, a method for synthesizing carbon nanocages is provided that comprises: a first step of forming a solution including a metal salt and an organic carbon source; a second step of drying the solution to obtain a precursor powder; and a third step of annealing the precursor powder in a carrier gas or a vacuum to obtain a nanocage including a metal nanoparticle surrounded by a carbon shell. In some implementations, the method further comprises a fourth step of removing the metal nanoparticle from the carbon shell to thereby form the carbon nanocage. In some implementations, the solution including the metal salt and the organic carbon source is an aqueous solution.

In some implementations, the organic carbon source used in the presently-claimed methods is citric acid. In some implementations, the organic carbon source utilized is an organic nitrogen-containing carbon source. In some implementations, the organic carbon source comprises a nitrogen-containing alkaloid, an amide, or a nitrogen-containing heterocycle. In some implementations, the amide is selected from urea or acetaminophen. In some implementations, the nitrogen-containing alkaloid is a purine, such as caffeine or theophylline. In some implementations, the nitrogen-containing heterocycle, such as a diazine, triazine, or hydrolyzed salts thereof. Optionally, in some implementations, citric acid can be utilized as a chelating agent and gel precursor together with a nitrogen-containing carbon source, such as those described above.

With respect to the metal salt utilized in accordance with the presently-disclosed methods, in some implementations, the metal salt is a transition metal salt. In some implementations, the transition metal included in such transition metal salts is selected from iron, copper, cobalt, molybdenum, manganese, and nickel. In some implementations, the metal salt is nickel acetate. In some implementations, the produced solution comprises an equal weight ratio of the metal salt and the organic carbon source. In some implementations, the solution comprises a weight ratio of organic carbon source to metal salt of about 10:1 to about 1:10. In some implementations, the step of drying the solution comprises drying the solution at a temperature of between about 60° C. to about 120° C., including, in some implementations, drying the solution at a temperature of about 80° C., about 90° C., or about 100° C.

In some implementations, the step of annealing the precursor powder comprises placing the precursor powder in a furnace, such as a horizontal tubular furnace. In some implementations, the carrier gas present during the annealing step is oxygen-free. In some implementations, the carrier gas is selected from $Ar_2$, $H_2$, helium, neon, xenon, $N_2$, or a combination thereof. In other embodiments, the step of annealing the precursor powder comprises annealing under high vacuum conditions. Further, in some implementations, the step of annealing the precursor powder is performed at a temperature of about 450° C. to about 1200° C. In some implementations, the temperature is about 500° C. to about 600° C. The step of annealing the precursor powder is, in some implementations, performed for a time period of about 1 minute to about 20 minutes. In some implementations, the step of annealing the precursor powder comprises annealing the precursor powder at a temperature of 600° C. for about 10 minutes.

Turning now to the step of removing the metal nanoparticle from the carbon shell, the step of removing the metal nanoparticle from the carbon shell generally comprises applying an inorganic acid to the nanocages. In some implementations, the inorganic acid is nitric acid.

In some implementations, the methods of the presently-disclosed subject matter produce a carbon nanocage with a size of about 2 nm to about 100 nm. In some implementations, the methods produce a carbon nanocage having a diameter of about 2 nm to about 4 nm, such as about 3 nm. In some implementations, the 2 nm to 4 nm nanocage has a wall thickness of about 2 or about 3 layers, and, in other instances, a 4 nm to 10 nm nanocage has a wall thickness of about 2 or about 6 layers or more. In some implementations, the carbon nanocage has a mono-modal pore distribution of about 2.5 nm and the carbon shell has a shell thickness of about 1 nm. In some implementations, the method produces a nitrogen-doped carbon nanocage with size of about 2 to about 100 nm. In some implementations, the nitrogen-doped carbon nanocages have an average size of about 7 nm and a wall thickness of about 2 to about 7 graphitic layers. In some implementations, the carbon nanocages produced by the presently-disclosed methods have Brunauer-Emmett-Teller (BET) surface area of about 980 to about 1150 $m^2g^{-1}$, and, in some implementations, the nitrogen-doped nanocages have a Brunauer-Emmett-Teller (BET) surface area of about 375 $m^2g^{-1}$ to about 657 $m^2g^{-1}$ or about 566 $m^2g^{-1}$. In some embodiments, the carbon nanocage is spherical.

Further features and advantages of the presently-disclosed subject matter will become evident to those of ordinary skill in the art after a study of the description, figures, and non-limiting examples in this document.

BRIEF DESCRIPTION OF THE DRAWINGS

FIGS. 1A-1P include images showing transmission electron microscopy (TEM) data from samples annealed in furnace at 500° C. (FIGS. 1A-1D), 600° C. (FIGS. 1M-1P). For each sample, low-magnification, intermediate-magnification, and high-resolution image is shown, along with SAED pattern.

(FIG. 2A) electron diffraction intensities measured for samples annealed in furnace at 500° C., 600° C., 700° C. and 850° C., where the data was obtained by rotational averaging of SAED patterns shown in FIGS. 1a-1p and was normalized (after background subtraction) at the strongest peak located at around 4.9 $nm^{-1}$, where X-ray diffraction pattern of nickel (ICDD PDF card #00-001-1258) is also included for comparison (bars), and where a nearly perfect match with experimental patterns can be noticed; and (FIG. 2B) high-resolution XPS spectra of Ni2p line for samples annealed in furnace at 500° C., 550° C., 600° C., and 700° C.

(FIG. 4A) STEM images of a sample flake; (FIG. 4B) STEM image of the same flake examined at higher magnification, where uniform nanoporous morphology with typical pore size in the 2-3 nm range is visible and where a few bright spots visible in this image are Ni particles left after etching and cleaning; (FIG. 4C) low-magnification HRTEM image of a piece of CNCs sample; (FIG. 4D) high-magnification HRTEM images showing several CNCs at the edge of sample flake where the CNCs are uniform, all having inner diameter of around 3 nm and most showing bi-layer walls; and (FIG. 4E) high-magnification HRTEM images showing several CNCs at the edge of sample flake where the CNCs are uniform, all having inner diameter of around 3 nm and most showing bi-layer walls.

(FIG. 5A) plots of the $N_2$ adsorption (stars) and desorption (circles) isotherms measured using the Brunauer-Emmett-Teller (BET) method for two CNCs samples synthesized at 600° C. and two standard samples, where the BET-derived specific surface area values measured for these samples were 1149±9 $m^2/g$; 983±7 $m^2/g$; 994±33 $m^2/g$; 191.7±1.1 $m^2/g$, respectively, and where nominal values for the two standards were ~1200 $m^2/g$ and 215 $m^2/g$, respectively, such that the measured values can be underestimated by about 15%; and (FIG. 5B) BET-based pore size distribution plots for two CNCs samples synthesized at 600° C. and two standard samples, where, for the CNCs samples, data show a single modal behavior, with the peak centered around 2.5 nm, which is in agreement with internal diameters of the nanocages observed in HRTEM images.

(FIG. 7A) the three peaks located at around 25, 43.5 and 80 deg corresponding to the (002), (100) and (110) reflections, respectively; and (FIG. 7B) experimental XRD profile (circles) corresponding to (002) reflection of graphene nanocages after background subtraction, where the solid line is calculated results using fitting Eq. (1) with parameters N=3 and d=0.34 nm.

(FIG. 9C) a graph showing peak deconvolution for C1s spectrum measured before and after nickel removal; and (FIG. 9D) a graph showing peak intensities of several C1s deconvolution components obtained before and after nickel removal for samples synthesized at 500° C., 550° C., 600° C. and 700° C.

(FIG. 10A) a schematic illustrating the charging-discharging process in supercapacitor structure with symmetrical electrodes comprising of CNCs; (FIG. 10B) specific capacitance of supercapacitor and (inset) corresponding galvanostatic charge-discharge curves at current densities between 90 mA/g and 2.25 A/g; and (FIG. 10C) cycling performance at the current density of 450 mA/g and (inset) a comparison of performance between 450 mA/g and 90 mA/g.

FIGS. 11A-11F include images showing: (FIG. 11A) TEM micrographs of samples from precursor powder with SAD inset; (FIG. 11B) a high magnification micrograph of initial powders showing fine nanometer sized Ni particles less than 2 nm; (FIG. 11C) TEM micrographs of nanocages synthesized at temperatures at 600° C.; (FIG. 11D) TEM micrographs of nanocages synthesized at temperatures at 600° C.; (FIG. 11E) TEM micrographs of nanocages synthesized at temperatures at 850° C.; and (FIG. 11F) TEM micrographs of nanocages synthesized at temperatures at 850° C.

FIGS. 17A-17C includes images and graphs of nitrogen-doped carbon nanocages including: TEM images of (FIG. 17A) unetched N—CNC and Ni nanoparticles morphology at high magnification; and (FIG. 17B) the etched sample at lower magnification showing a cage size distribution; and (FIG. 17C) BET nitrogen adsorption-desorption isotherm and (inset) a pore distribution of the etched N—CNCs.

(FIG. 18A) XPS spectra of N is line of the N-doped CNC sample and the sketch showing the origin of different types of nitrogen lines; and (FIG. 18B) Raman spectra of N-doped CNCs compared with undoped CNC material and (inset) the relation between D/G and D'/G peak ratios.

DESCRIPTION OF EXEMPLARY EMBODIMENTS

Figures 1A, 1B, 1C, 1D:
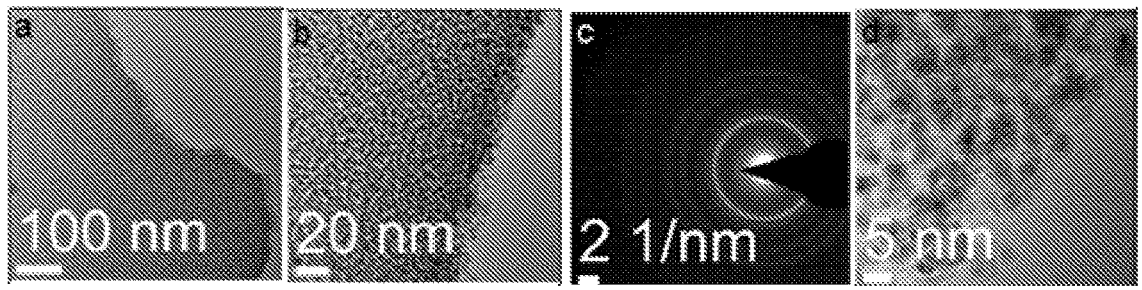

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as is commonly understood by one of skill in the art to which the invention(s) belong. All patents, patent applications, published applications and publications, databases, websites and other published materials referred to throughout the entire disclosure herein, unless noted otherwise, are incorporated by reference in their entirety. In the event that there is a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "a nanocage" includes a plurality of such nanocages, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The presently-disclosed subject matter is based, at least in part, on the discovery of a scalable and inexpensive method of obtaining ultrafine carbon nanocages by controlled thermolysis of an organic-inorganic precursor prepared by a sol-gel method. More specifically, it has been determined that the presently-disclosed methods can, in some embodiments, produce a highly-homogenous material, consisting primarily of bi- and tri-layer graphene nanocages with uniform internal diameters of less 3 nm. In some embodiments, by controlling the thermolysis, nanocages with high surface area and electrochemical properties and performance can be obtained. Due to the stability, high surface area, open pore structure, and electrical conductivity of these nanocages, the nanocages are then particularly suitable as supercapacitor electrode materials. Moreover, the synthesis methods disclosed herein can be used to produce N-doped carbon nanocages (N—CNCs) to achieve a lower cost metal-free catalyst. The presently disclosed methods can produce N—CNCs that are synthesized directly in a one-step synthesis process with a controlled tunability of nitrogen doping level and size of cages, which allow for the development of scalable, inexpensive and highly-active catalysts.

The presently-disclosed subject matter thus includes, in certain embodiments, methods of producing homogenous, mesoporous carbon nanocages, a form of carbon comprised of a three-dimensional (3D) network of interconnected hollow spherical nanoshells. In some implementations, a method for synthesizing carbon nanocages is provided that comprises: a first step of forming a solution including a metal salt and an organic carbon source; a second step of drying the solution to obtain a precursor powder; and a third step of annealing the precursor powder in a carrier gas to obtain a nanocage including a metal nanoparticle surrounded by a carbon shell. In some embodiments, the method can further comprise a fourth step of removing the metal nanoparticle from the carbon shell to thereby form the carbon nanocage. In some implementations, the solution including the metal salt and the organic carbon source is an aqueous solution or a solution comprising a solvent capable of suitably dissolving the particular metal salt being utilized.

With respect to the first step of the synthesis method, namely the provision of a metal salt and an organic carbon source to form an solution, numerous metal salts can be used in accordance with the presently-disclosed methods including, but not limited to, salts of transition metals, such as iron, copper, cobalt, molybdenum, manganese, nickel, and the like. In some embodiments, the salts of such transition metals are water soluble such that the transition metal salts can be included in an aqueous solution. For example, and as described in further detail below, in certain embodiments, a powder of nickel acetate ($Ni(CH_3CO_2)_2 \cdot 4H_2O$ can first be provided and then combined with a suitable organic carbon source solution to produce an aqueous solution in accordance with the presently-disclosed subject matter.

With respect to the organic carbon source, the term "organic carbon source" is used herein to refer to various water soluble organic materials capable of being combined with a metal salt and then serving as a source of carbon for the production of carbon nanocages. For example, in some embodiments, the organic carbon source is citric acid. Numerous organic carbon sources can be used in this regard.

In certain implementations, the organic carbon source can be selected to achieve a desired functionalization and/or doping of the carbon nanocages produced in accordance with the presently-disclosed methods. In some instances, the organic carbon source contains nitrogen. In some implementations, the carbon source is a nitrogen-containing alkaloid, for example, in some implementations, a purine, such as caffeine or theophylline. In some implementations, the organic carbon source is a nitrogen-containing heterocycle, such as, in certain implementations, a diazine, a triazine, or hydrolyzed acids thereof. In some implementations, the carbon source is an amide, such as urea or acetaminophen. Based on the desired catalytic activity, different types of nitrogen species can be chosen (for example, pyridine, graphitic) as they exhibit different degrees of catalytic activity. For example, pyridinic nitrogen in carbonous materials is primarily responsible for the catalytic activity of an exemplary N-doped carbon structure disclosed herein. Co-doping is also envisioned and can be included in the solution, including sources of elements such as sulphur, phosphorus and boron. Optionally, citric acid can be used as a chelating agent and gel precursor.

Regardless of the particular metal salt and organic carbon source selected, upon selection, the metal salt and the organic carbon source, and optionally, nitrogen source, are then typically combined in the solution in amounts sufficient to ensure that a sufficient amount of metal is present to allow for the formation of metal nanoparticles upon which the carbon nanocages can then be formed, as also described below. Of course, the selection of a particular amount of metal salt, organic carbon source, and optional nitrogen source to be combined to form an solution can depend on a number of factors including the amount of nanocages to be produced, the thicknesses of the nanocages to be produced, pore size, catalytic activity and the like. In some implementations, however, the metal salt and the organic carbon source are combined such that the solution comprises an equal weight ratio of the metal salt to the organic carbon source. In other implementations, the weight ratio of the organic carbon source, and, optionally, the nitrogen source to the metal salt is between about 10:1 to about 1:10. In some implementations, the weight ratio can be adjusted to control the size of the synthesized nanocages.

Once the metal salt and organic carbon source are combined in the solution, the solution is subsequently dried to obtain a precursor powder. The precursor powder is then dried, such as by placing the precursor powder in an oven at a temperature between about 60° C. and 120° C. In some implementations, the precursor powder is dried in an oven at a temperature of about 90° C. Then, once the precursor powder has been sufficiently dried, the precursor powder can be annealed to obtain a metal nanoparticle surrounded by a carbon shell.

With respect to the third step of the presently-disclosed methods, the annealing of the precursor powder can be performed at various temperatures depending on the desired properties of the nanocages to be produced and the metal salt utilized. In some implementations, the annealing is performed at a temperature of about 600° C. In some implementations, the annealing is performed at a temperature range of about 450° C. to about 1200° C. In other implementations, the annealing temperature is about 500° C., about 550° C., about 600° C., about 700° C., about 850° C., about 900° C., about 1000° C., about 1100° C., or about 1200° C. In some implementations, the temperature is about 500° C. to about 600° C. In this regard, and without wishing to be bound by any particular theory or mechanism, it is contemplated that high-temperature annealing can, in some applications, improve the electric conductivity of the materials, aid in the removal of any residual oxygen present in the precursor powder, and or enhance the structural stability of the material.

In some implementations, to allow for the precursor powder to properly anneal and produce the desired nanocages, the precursor powder is heated from room temperature to the annealing temperature at a rate of about 25° C./min to about 100° C./min. In some implementations, the rate of heating is about 50° C./min. In other implementations, to allow for rapid temperature changes, the step of annealing the precursor powder comprises placing the precursor powder in a horizontal tubular furnace that advantageously further allows the carbon nanocages to be produced in an open system unlike previously-described methods that make use of a closed system where materials are in a sealed environment under pressure. Of course, it is also contemplated that, for small samples, other tube furnaces can be utilized, while, for larger samples, the selection of appropriate furnaces can be based, at least in part, on the annealing temperature.

With further respect to the step of annealing the precursor powder, in some implementations, the step of annealing the precursor powder comprises annealing the precursor powder for a time period of about 1 minute to about 20 minutes. In some implementations, the precursor powder is annealed for about 10 minutes. In some implementations, the nanocage size, size uniformity of the produced nanocages, and electrochemical performance of the nanocages can be specifically tuned by adjusting the annealing time and/or the annealing temperature. For instance, in some implementations, the nanocages are produced by annealing the precursor powder at a temperature of about 600° C. for about 10 minutes as such a temperature and time period has been shown to produce nanocages having sufficient size, size uniformity, and electrochemical performance.

To facilitate the removal of gaseous reaction products, the annealing of the precursor powder is typically performed in a carrier gas whose flow rate can be adjusted according to the processing conditions and capacity of the heating device utilized (e.g., a continuous flow of a carrier gas at a flow rate of about 50 to about 100 cc/min). In some implementations, the carrier gas is oxygen-free. In some implementations, the carrier gas is selected from argon, hydrogen, helium, neon, xenon, nitrogen, or combinations thereof. In some implementations, where a combination of carrier gases is used, the molar ratio of the carrier gases is about 1:1, about 1:2, about 1:3, or about 2:3. In some implementations, the carrier gas is a combination or argon and hydrogen ($Ar_2:H_2$). In other implementations, the precursor powder can be annealed under high vacuum conditions.

After the completion of the annealing of the precursor powder, the presently-disclosed method produces a carbon nanocage encapsulating a metal nanoparticle. In other words, the annealing of the precursor powder allows for a nanocage to be produced that includes a metal nanoparticle surrounded by a carbon shell including, in some instances, a nitrogen-containing carbon shell. In this regard, in such embodiments, because of the carbon encapsulation, the metal nanoparticles are generally stable and are protected against sintering, such that the nanoparticles themselves can have several potential applications, including, for example, catalysis, sensors and actuators, magnetic and/or magneto-optical structures, and bio-medical applications.

In other implementations of the presently-disclosed subject matter, after the completion of the annealing step, it is desirable to remove the metal nanoparticle from the nanocage. To allow for such a removal, in some embodiments, the metal nanoparticle is removed from the carbon shell by treating the material with an inorganic acid solution to thereby remove the metal nanoparticle. In some embodiments, the nanomaterial is treated with a dilute nitric acid solution. In some instances, the removal is performed at room temperature. In other implementations, the removal can be performed at elevated temperatures, for example, up to 100° C.

Following removal of the metal, the material is, in some embodiments, then washed with ethanol and subsequently with distilled water to produce a carbon nanocage in accordance with the presently-disclosed subject matter. In some implementations, a step of washing is then performed until the nanomaterial is at a pH of about 6 to 8, in some embodiments, the pH is about 7. In some implementations, the material is washed with water. In other implementations, the material is washed with ethanol. After washing, the purified carbon nanocages can be dried in the air or in the oven at a temperature below 200° C.

In some implementations, the carbon nanocages that are produced have a substantially uniform size and can have, in some embodiments, a diameter of about 3 nm. Furthermore, by making use of the presently-disclosed methods, carbon nanocages can be produced having a wall thickness of about 2 or about 3 layers, about 4 or about 5 layers, or more. The size of the metal particles can affect the number of layers, for example, the larger the particle, the more layers can be produced. In some instances, the method produces nitrogen-doped carbon nanocages with size of about 2 to about 100 nm. In some implementations, the nitrogen-doped carbon nanocages have an average size of about 10 nm.

In some implementations, the produced carbon nanocages are spherical. In some implementations, the carbon nanocages have a BET surface area of about 980 $m^2g^{-1}$ to about 1150 $m^2g^{-1}$, a mono-modal pore distribution of about 2.5 nm, and/or uniformly distributed pores. In other embodiments, the nitrogen-doped nanomaterial has a Brunauer-Emmett-Teller (BET) surface area of about 375 $m^2g^{-1}$ to about 657 $m^2g^{-1}$ or about 566 $m^2g^{-1}$. In other implementations, the carbon shell has a thickness of about 1 nm. In some implementations, the nitrogen-doped nanomaterial has the average pore size of about 7 nm.

With regard to the N-doped carbon nanocages, the presently-disclosed methods can lead to the nitrogen doping at a level of about 1% to about 10% level with the dopant substituted at the desired carbon sites, in some instances, about 5% nitrogen doping.

As one exemplary method of producing carbon nanocages having such properties, in some implementations, nickel acetate is first provided and combined with citric acid to form a aqueous solution and then a precursor powder upon drying. During subsequent annealing, as a metal salt, the nickel acetate then undergoes decomposition at temperatures as low as 200° C., and leads to homogenous nucleation and formation of metallic nickel nanoparticles. At temperatures of up to about 600° C., such nanoparticles have been observed to have a narrow, mono-modal size distribution with the average diameter of about 3 nm for a precursor powder formed with the 1:1 weight ratio. In this regard, the nickel nanoparticles are generally homogenously distributed within the sample's volume in such embodiments and form a densely-packed structure with each of the nickel nanoparticles separated from its neighbors by a thin (1-2 nm) layer of a carbonaceous material (i.e., from the citric acid). Starting at around 500° C., the organic component of the precursor (i.e., the citric acid) then decomposes and undergoes catalytic conversion at the nickel metal surface, which leads to the formation of a thin, few atomic layer-thick (e.g., bi- and tri-layer) carbon shell on the surface of nickel NPs. In some embodiments, for samples annealed between 500° C. and 600° C., that catalytic process then leads to the development of a well-developed three-dimensional network of densely-packed, interconnected carbon nanocages, encapsulating nickel nanoparticles. In some embodiments, chemical etching in aqueous solution of acid followed by washing in distilled water is then used to remove then nickel. After drying, a high-quality, homogenous carbon nanocage material is obtained having the above-described properties.

By producing carbon nanocages using the above-described methods, the produced nanocages exhibit properties making the nanocages particularly suitable for a number of applications. For example, because the nanocages of the presently-disclosed subject matter have a high surface area, in some embodiments, the nanocages are particularly useful as materials for high surface area electrodes. In some embodiments, the nanocages can be used for supercapacitor electrodes such as EDLS, pseudocapacitors, and hybrid supercapacitors. In other instances, the nanocages can be utilized as high surface area electrodes for fuel cells or secondary lithium batteries, such as, for example, cathodes for Li—S and Li-air batteries, and as anodes for Li-ion batteries. In yet other embodiments, the carbon nanocages can be used as high surface area catalyst supports and in catalysis, as membranes for gas separation, as active materials for gas storage, as adsorbers for water purification, as drug delivery systems, as sensors, and for encapsulating magnetic particles.

The presently-disclosed subject matter is further illustrated by the following specific but non-limiting examples.

EXAMPLES

The following examples provide exemplary methods for producing carbon nanocages and N-doped carbon nanocages. The synthesized materials were characterized by a series of techniques, including electron microscopy, XRD, XPS, Raman spectroscopy and BET gas adsorption/desorption methods, and electrochemical evaluations.

Example 1

Disclosed herein below is a scalable method of producing densely-packed three-dimensional structures of interconnected ultrafine thin-shelled carbon nanocages. The method was used to fabricate materials that exhibited high electrochemical performance as supercapacitor electrode materials. As described below, the nanocages were synthesized via templating on the surface of nickel nanoparticles formed in situ during thermolysis-based processing of a sol-gel precursor consisting of nickel acetate and citric acid. Processing of the precursor at moderate temperatures of around 600° C. led to formation of densely-packed structures of ultrafine mono-sized 3 nm metallic nickel nanoparticles, with each of the nanoparticles separated from its neighbors by an ultra-thin, 2-3 atomic layer-thick, carbon layer. The carbon nanocage material could then be obtained by subsequent acid treatment and the dissolution of the nickel nanoparticles.

As also described herein below, a number of such samples were prepared at different processing temperatures and comprehensively studied in terms of their structure, composition and chemistry using various characterization techniques, including electron microscopy, XRD, XPS, Raman and FITR spectroscopy, as well as BET gas adsorption/desorption-based method. In addition, a series of in situ TEM synthesis experiments were conducted to better understand the mechanism of nanostructure formation. Furthermore, a theoretical model of densely-packed truncated octahedrons was developed and used to explain the relationships between structural parameters of the nanocages and their BET specific surface area. The model yielded an agreement with experimental data. To further the study, a sample of the nanocage material exhibiting high BET specific surface area of about 1150 $m^2/g$ was also tested as electrode material in an electrochemical double-layer capacitor. The obtained specific capacitance of 205 $Fg^{-1}$ confirmed the high electrochemical performance of the nanocage structures and validated their potential for use as electrode materials in high energy storage systems.

Materials and Methods
Preparation of Carbon Nanocages:
Carbon nanocages were synthesized by an in situ nickel template method. Initially, aqueous solutions of nickel acetate ($Ni(CH_3CO_2)_2.4H_2O$) and citric acid ($C_6H_8O_7$) powders (Sigma-Aldrich) dissolved in equal proportions (by wt %) were prepared. The solution was then dried in an oven at 90° C. and the obtained precursor powder was used for the synthesis of nanocages. For this, the powder, placed in a quartz crucible, was inserted into a horizontal tubular furnace and annealed in a continuous flow (at flow rate of 80 cc/min) of a hydrogen-argon gas mixture (mixed in a molar ratio of 2:3). Five different samples were synthesized by heating the precursor (at the heating rate of 50° C./min) from room temperature to 500° C., 550° C., 600° C., 700° C., and 850° C., respectively, and holding the samples at these temperatures for 10 min. After annealing, the powders were cooled inside the furnace to room temperature to avoid oxidation. Annealing of the powders resulted in the synthesis of bi-layer graphene cages encapsulating nickel nanoparticles. The powder from the furnace was treated with dilute nitric acid solution to remove nickel. This was followed by washing with ethanol and finally by distilled water.

Structural Characterization and Analysis:
The microstructure and morphologies of the carbon nanocage samples were investigated using scanning electron microscopy (SEM) in Carl Zeiss FE-SEM Supra 35VP and transmission electron microscopy (TEM) in FEI Tecnai F20 operated at 200 kV. Several TEM-based techniques, including diffraction contrast imaging, high-resolution transmission electron microscopy (HRTEM) and selected area electron diffraction (SAED) were used to analyze these samples. In addition, elemental analysis was also carried out using TEM-based energy dispersive X-ray spectroscopy (EDAX Inc.) and electron energy loss spectroscopy (EELS). EELS spectra were collected in the nanoprobe mode using a 1 nm nanoprobe.

Nucleation and structural evolution of nickel nanoparticles, as well as formation of nanocages during annealing was studied in situ in TEM using a single-tilt Gatan heating stage. For that study, the precursor powders were dispersed on a gold TEM grid-supported holey carbon films. The precursor powders were heated at a rate of 50° C./min to different temperatures (400° C., 500° C., 600° C., 850° C.) and held for 10 min. The structure of carbon layers in the nanocages was characterized by Raman spectroscopy (Renishaw inVia Raman system) using a 632 nm, He—Ne laser in a spectral range of 100-3500 cm-1. Phase analysis of the carbon nanocages before and after etching was carried out using X-ray diffraction (Bruker D8 Discover) with nickel-filtered Cu-Kα radiation)($\lambda$=1.5418 A°. The Brunauer-Emmett-Teller (BET) specific surface area was determined from nitrogen adsorption-desorption isotherms using the Micromeritics TriStar 3000. The bonding properties of the carbon nanocages were characterized with Attenuated Total Reflectance Fourier Transform Infrared Spectroscopy (ATR-FTIR Perkin-Elmer, Spectrum series 100 spectroscopy). The surface chemistry was studied using X-ray photoelectron spectroscopy (XPS) in VG Thermo-Scientific MultiLab 3000 ultra-high vacuum surface analysis system. Electrochemical measurements were conducted for the supercapacitor electrode prepared from the nanocages synthesized at 600° C. after removal of nickel nanoparticles. The electrode materials for both electrodes are made using 90 wt % active material (carbon nanocages) and 10% polyvinylidene fluoride (PVDF) binder distributed in N-methyl-2-pyrrolidone (NMP) solvent. The well-mixed slurry is coated onto golden disks (thickness of approximately 60 mm; surface area of ~1.29 $cm^2$). The electrodes are then dried at 120° C. for 12 hours under vacuum. Electrochemical performance of CNCs sample is measured in a symmetric Swagelok® cell configuration system using a cellulose separator and 1 M $H_2SO_4$ aqueous solution as the electrolyte. The charge/ discharge measurements are carried out over a potential range between 0 and 0.8 V in a battery tester Atlas Sollich 0531 EU&IA.

Results and Discussion

Figures 1E, 1F, 1G, 1H:
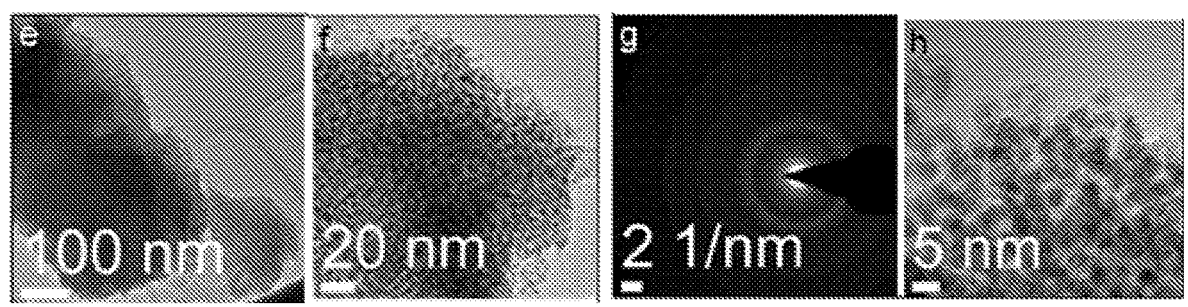
(FIGS. 1E-1H), 700° C.
Figures 1I, 1J, 1K, 1L:
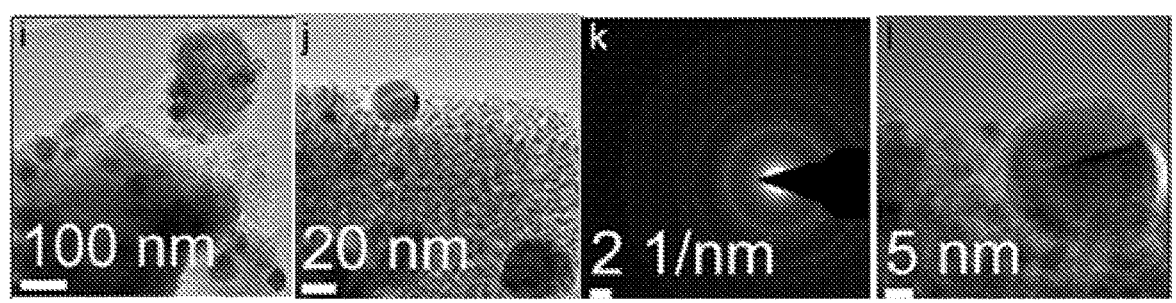
(FIGS. 1I-1L) and 850° C.
Figures 1M, 1N, 1O, 1P:
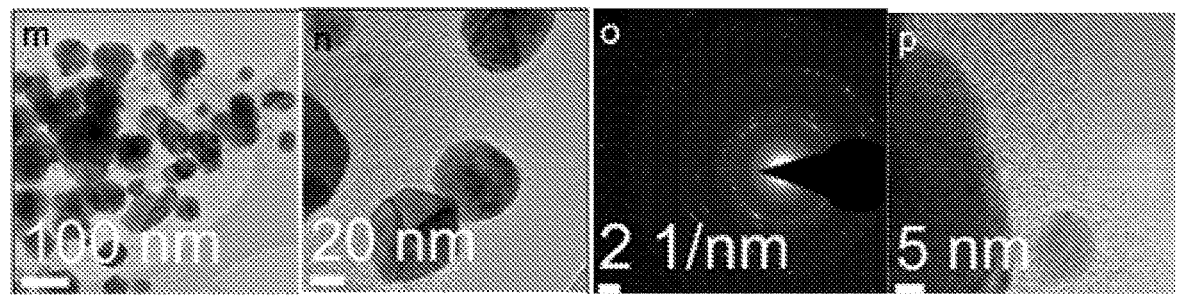

FIGS. 1A-1P show TEM data from samples synthesized at temperatures between 500° C. and 850° C. It can be noticed that synthesis at moderate temperatures, in the 500° C. to 600° C. range, led to the formation of densely-packed mono-sized particles with diameters of around 3 nm. HRTEM images (FIG. 1D and FIG. 1H) showed that these particles were coated with thin carbon shells consisting of 2-3 graphitic layers. An increase of the synthesis temperature to 700° C. caused some of the particles to disappear leaving empty carbon shells only (FIG. 1L). At the same time, much larger particles with diameters of up to 50 nm, covered with thicker graphitic shells of 5 or more carbon layers, were formed. Similar changes but even stronger were also observed after synthesis at 850° C. TEM analysis showed that 3 nm particles were almost completely extinct and the smallest particles were present in small numbers only, having diameters in the 6-8 nm range. In fact, the majority of particles in 850° C. samples were much bigger with diameters ranging from about 20 and 100 nm (FIG. 1M) and the particles were coated with thick graphitic shells containing as much as 15 or more carbon layers. While none of the 3 nm particles were left, their carbon shells remained practically intact and interestingly they formed a self-standing interconnected 3D network, i.e., a structure typical of carbon nanocages (FIGS. 1M, 1N, 1P).

Figure 2A:
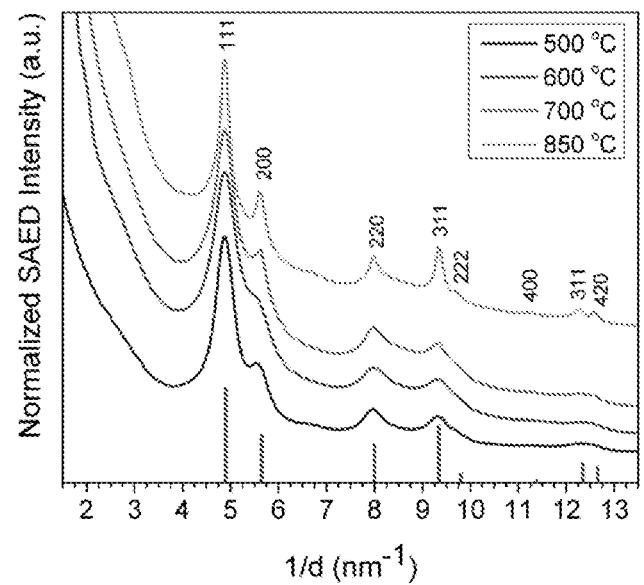
FIGS. 2A-2B include graphs showing.
Figure 2B:
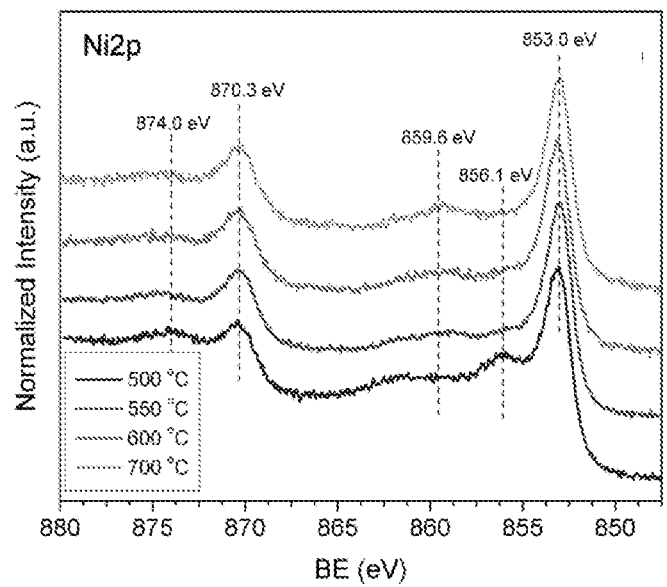
Figure 3:
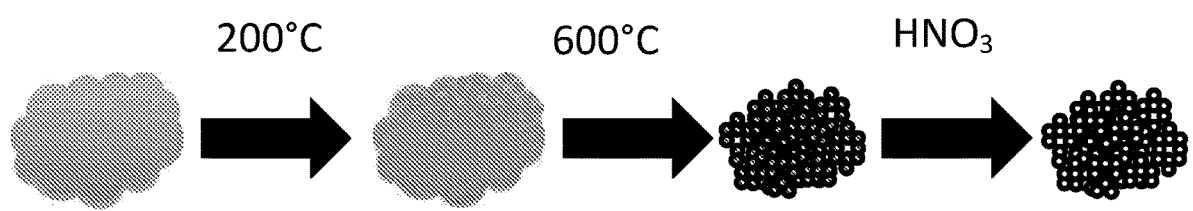
FIG. 3 is a schematic diagram showing exemplary synthesis steps for synthesizing carbon nanocages in accordance with the presently-disclosed subject matter.

Structural features associated with different synthesis temperatures were also reflected in electron diffraction patterns. While all samples showed well-defined SAED ring patterns, in agreement with the crystalline nature of the particles, samples synthesized at lower temperatures, showed only rings that were broad and continuous (FIGS. 1C, 1G), which is consistent with the exclusive presence of small (i.e., in or case 3 nm-large) particles. On the other hand, samples synthesized at high temperatures, especially at 850° C., exhibited additional strong diffraction spots (FIGS. 1K, 1O), which indicated the additional presence of bigger particles (i.e., 20 to 100 nm). This was consistent with TEM observations. In order to further analyze and compare more qualitatively electron diffraction data, the patterns were quantified by extracting rotational average curves using DiffTools software and by directly comparing them in terms of ring diameters and intensities. As seen from FIG. 2A, such comparison indicated that all samples contained the same crystalline phase which showed an excellent match with metallic nickel (ICDD PDF card No. 00-001-1258). This was best observed for samples synthesized at 850° C., which due to the presence of large particles, showed strong, well-resolved peaks which could be unambiguously assigned to diffraction peaks of metallic nickel. The presence of metallic nickel was also independently confirmed by XPS. In FIG. 2B, Ni2p high-resolution XPS spectra of several samples synthesized at different temperatures were compared. For all samples, the same binding energies of the Ni2p components, equal 853.0 eV and 870.3 eV for the $Ni2p_{3/2}$ and $Ni2p_{1/2}$, respectively, were measured. These values agreed well with previous reports for metallic nickel.

In situ TEM heating studies further clarified the synthesis process and its temperature dependence. Experimental results, both TEM images and SAED patterns, obtained in a series of in situ experiments, involving heating of the precursor to temperatures between 200° C. and 850° C., are shown in FIG. 1I. As observed, the synthesis consisted of two distinctive cooperative steps: (1) formation of nickel nanoparticles followed by (2) catalytic growth of graphitic shells.

The first step started with the thermolysis of nickel acetate, which initially decomposed to an intermediate phase of nickel carbide ($Ni_3C$) and then, together with the basic acetate, to nickel metal. At elevated temperatures, nickel atoms exhibited enhanced diffusion and clustering, which resulted in homogenous nucleation of metal nickel particles. Due to such mechanisms, parameters of the particles (diameters, density, etc.) were dependent on several factors including nickel diffusion rate (temperature, heating rate, material composition, etc.) and precursor composition (amount of nickel acetate, type of the organic component, etc.). Previous reports indicated that nickel acetate decomposed above 250° C. However, nucleation of nickel particles was observed starting at a somewhat lower temperature of about 200° C., which may be due to additional electron beam-induced heating during in situ experiments.

The second step, i.e. the formation of thin graphitic shells (for the specific precursor and conditions used in the study, primarily bi- and tri-layer shells were formed), involved the so-called dissolution-precipitation mechanism, which occurred upon further heating. First, the increase of temperature (above 150° C.) led to the thermolysis of citric acid and formation of amorphous carbon, which then gradually began to dissolve into nickel particles. This continued until super-saturation was reached in some region inside particles and carbon segregation in the form of graphitic layers formation, was triggered at the particles surface. In this process, metastable nickel carbide was also formed as an intermediate product, but it decomposed quickly under the synthesis conditions. Nickel, similarly to several other transitions metals (Fe, Co, Cu, etc.) was an efficient catalyst for the graphitization of amorphous carbon and its high catalytic activity towards this process originated from the d-electron configuration and ionization potential. The formation of graphitic shells at relatively low temperatures (~500° C.) observed in the exemplary samples, was due to small sizes of nickel particles and associated enhanced carbon diffusion across their surface.

The in situ study, in agreement with ex situ experiments (FIGS. 1A-1H), indicated that between 500° C. and 600° C., the nickel-mediated catalytic growth of carbon shells led to the formation of a well-developed 3D network of densely-packed, interconnected carbon nanocages, each encapsulating a nickel particle. In addition, the study showed that annealing at higher temperatures causes Ostwald ripening of nickel particles (FIGS. 11C, 11E), driven by the reduction of the total surface energy of the system. Initially, despite its mono-modal character, particle size distribution had a finite width, i.e., there were smaller and larger particles present in the material. During heating above approx. 600° C., smaller particles started to melt and highly mobile nickel atoms, released in this process, began to diffuse through the carbon network and eventually re-attached at the surface of larger particles, which caused their size increase. This phenomenon started at much lower temperatures than the melting point of bulk nickel, which is 1455° C. However, it is known that nanoparticles melt at much lower temperatures than their bulk counterparts and that the melting point decreases rapidly with decreasing of the nanoparticle size. Similar agglomeration and Ostwald ripening of nickel particles above 600° C. is evidenced in ex situ annealed samples (FIGS. 1I-1P).

Figure 4A:
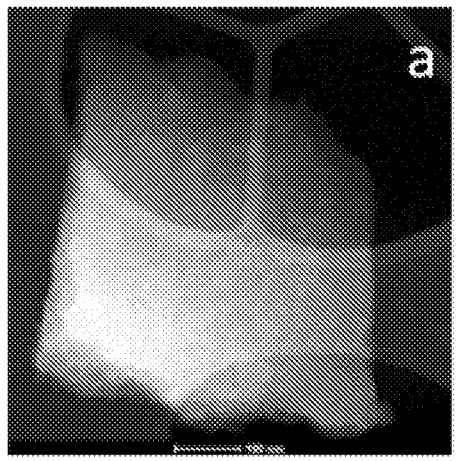
FIGS. 4A-4E includes images showing the morphology and nanostructure of CNCs sample synthesized at 600° C., including.
Figure 4B:
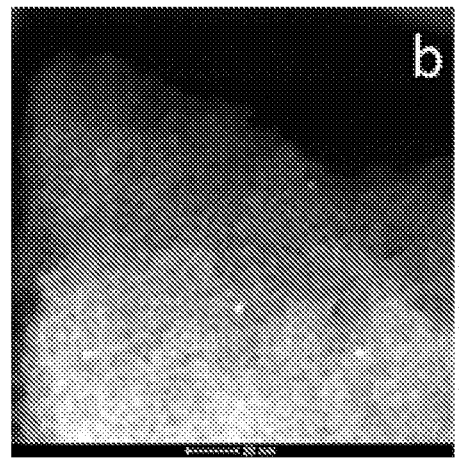
Figure 4C:
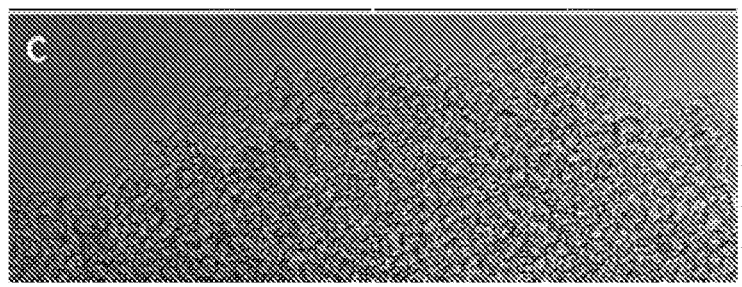
Figure 4D:
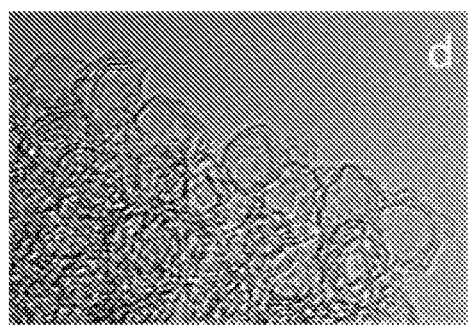
Figure 4E:
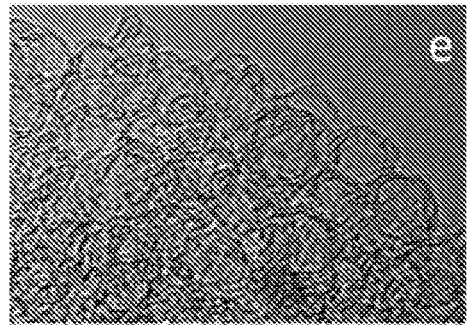
Figure 12:
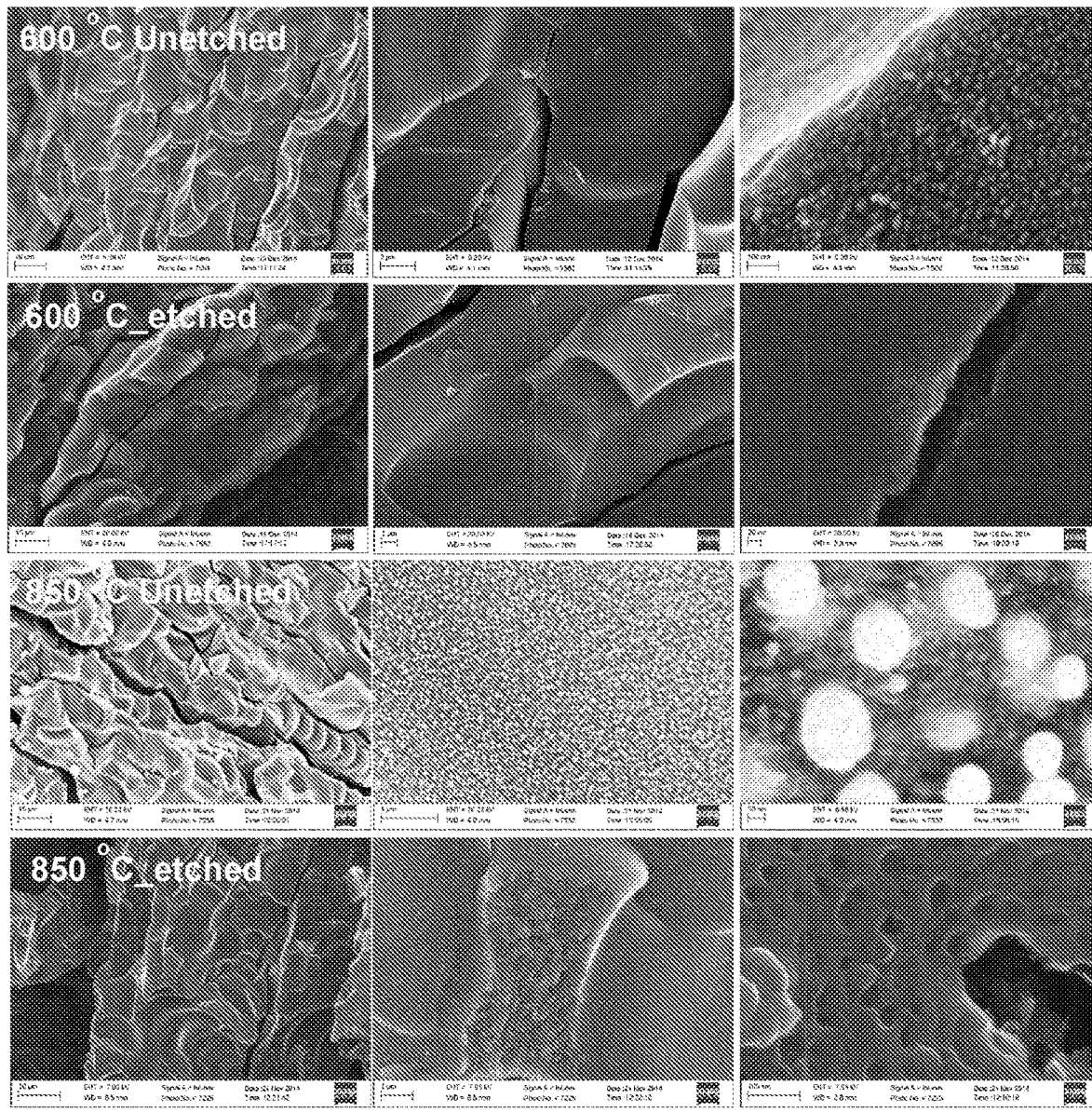
FIG. 12 includes SEM images of nanocages synthesized at 600° C. (top) and 850° C. (bottom) before and after removal of nickel particles.

Following the synthesis experiments, samples annealed at 600° C., were selected for the fabrication of 2 nm-sized carbon nanocages. Purified nanocages were obtained by removal of nickel particles using dissolution in aqueous solution of nitric acid, followed by washing in ethanol and distilled water. Morphology and structure of the samples prepared by this approach were studied in detail by means of electron microscopy. Typical results obtained are summarized in FIG. 4. First, it can be seen from the Z-contrast HAADF STEM images (FIGS. 4A, 4B) that samples consisted of large nanoporous grains, that their uniformly-distributed pores were in the 2-3 nm size range, and that the material was practically nickel-free. HRTEM study (FIGS. 4C-4E) revealed that nanopores were in fact bi- or tri-layer nanocages, and that they were interconnected and formed a 3D structure. Continuous monolithic microporous structure of the synthesized materials was further confirmed by the SEM analysis at magnifications ranging from the nano- to sub-millimeter scale (FIG. 12).

Figure 5A:
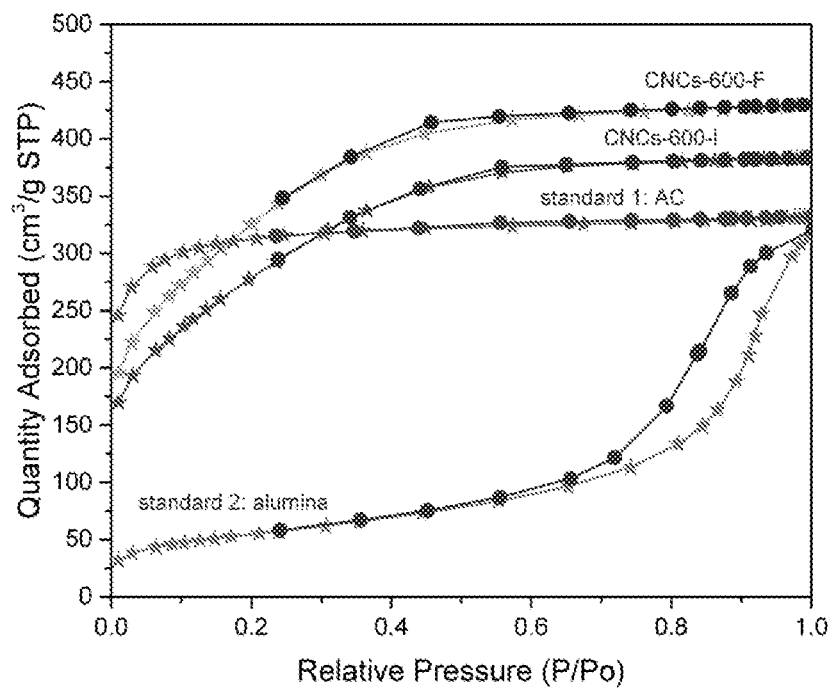
FIGS. 5A-5B include graphs showing.
Figure 5B:
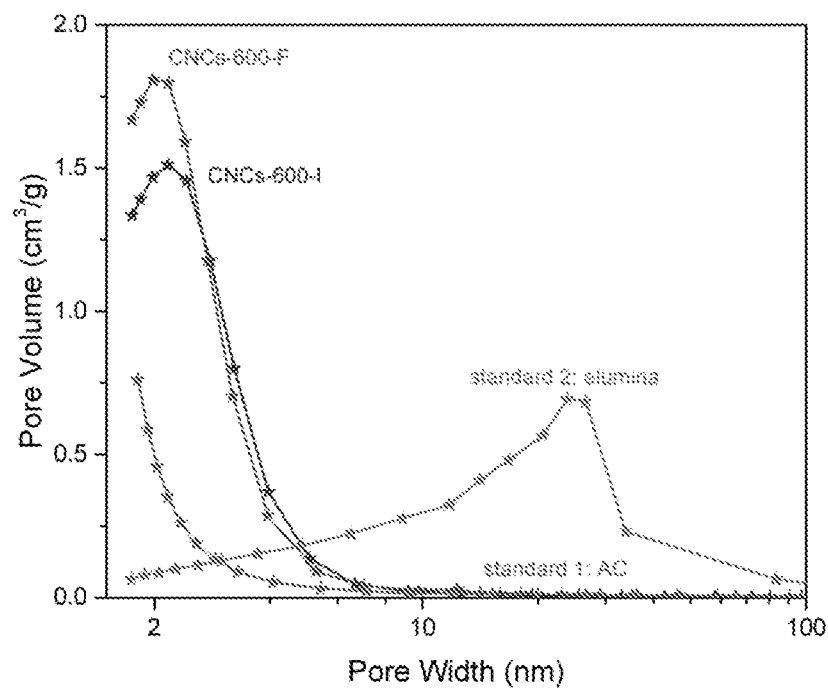

The high porosity of the material was further verified and studied in detail by the BET method. Typical nitrogen adsorption-desorption isotherms of such samples are shown in FIG. 5A. The isotherms were of the Type I, and their analysis yielded high specific surface area value of about 1150 m$^2$/g, confirming highly porous open structure of the material. The BET analysis indicated also a mono-modal pore distribution with its peak centered at around 2.5 nm (FIG. 5B), which was in agreement with HRTEM results.

Figure 6:
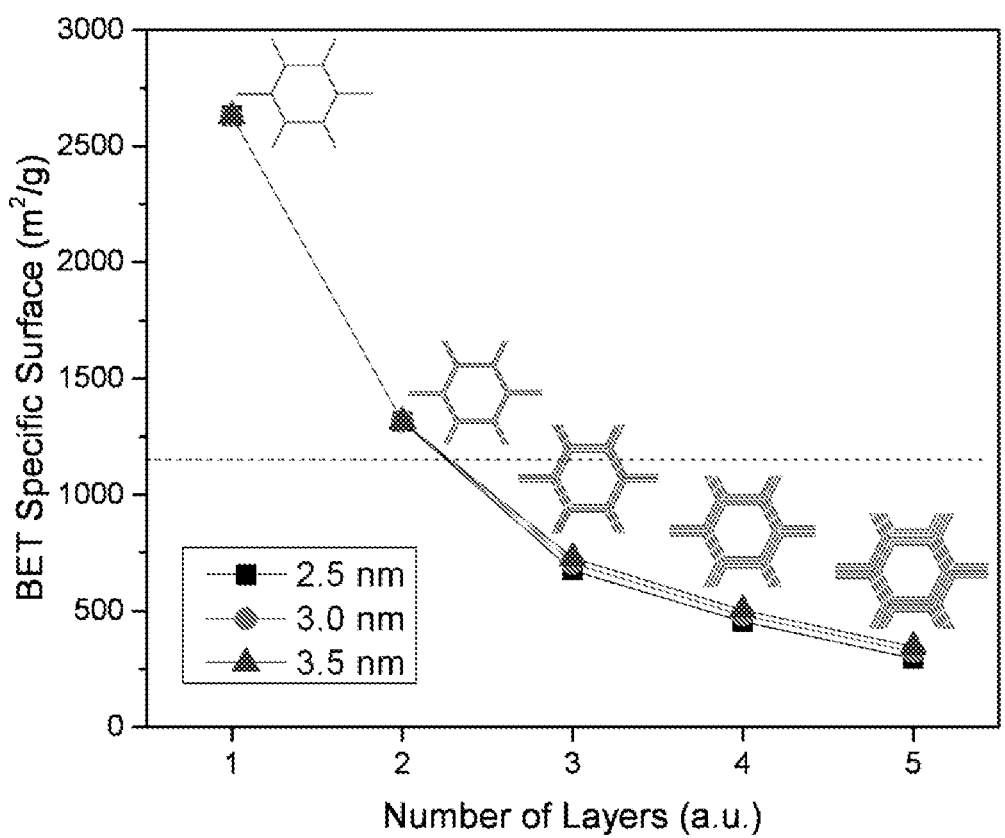
FIG. 6 is a graph showing BET surface area calculated based on the truncated octahedron model for nanocages with three different inner diameters and with 1 to 5 layers between adjacent nanocages, where the dashed lines represent the experimental value of approximately 1150 $m^2/g$ measured for the presently-disclosed nanocages with 2.5 nm inner diameter, and where the model indicates that the number of layers between nanocages in the exemplary samples is between 2 and 3, which is in agreement with HRTEM and XRD.
Figure 13A:
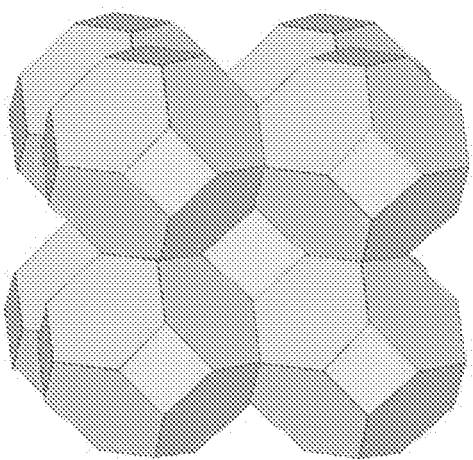
FIGS. 13A-13B include schematic diagrams showing (FIG. 13A) a model based on truncated octahedrons which are the only space-filling polyhedrons besides cubes, and a model showing that (FIG. 13B) a truncated octahedron can be constructed from a regular octahedron by removing of its six right square pyramidal corners.

A simplified model of densely-packed truncated octahedrons (FIG. 13) was proposed to interpret the specific surface area values obtained from BET and discuss them in terms of nanocages diameters and shells thickness. Truncated octahedrons are the only known space-filling polyhedrons besides cubes and they are a much better approximation of spheres then cubes. Results of the calculations for different nanocages diameters (including 2.5 nm obtained experimentally for the present material) and shell thickness between 1 and 5 atomic carbon layers are summarized in the plot shown in FIG. 6. Comparing the calculations with the experimentally obtained BET surface area value indicated that nanocages have shells containing between 2 and 3 carbon layers, which agreed with HRTEM and XRD measurements.

Figure 7A:
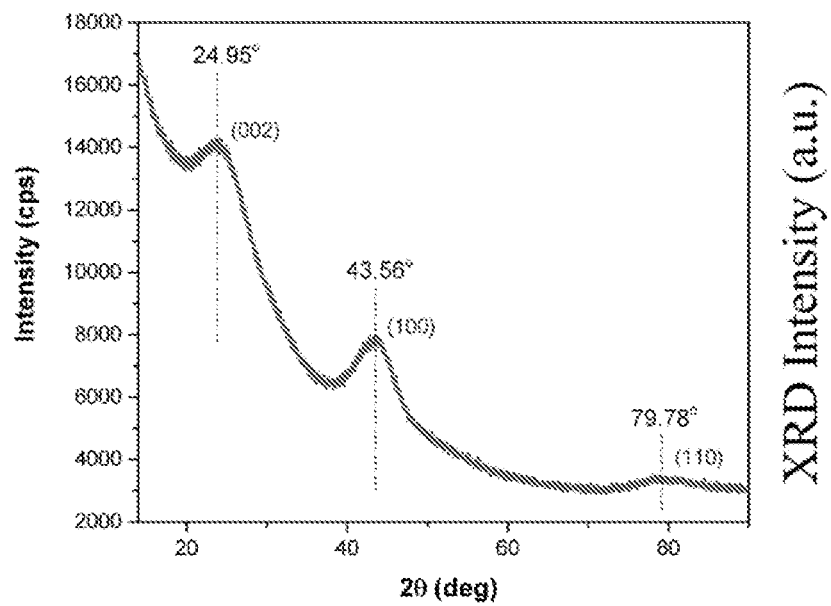
FIGS. 7A-7B are graphs showing XRD pattern of a CNCs sample synthesized at 600° C., including a graph showing.

In addition to TEM, XRD was also used to analyze the crystallinity and crystal structure of the nanocages. A typical XRD pattern of material synthesized at 600° C. after washing off nickel particles is shown in FIG. 7A. Four relatively broad diffraction peaks were observed. The peaks parameters, i.e., their location and half width at full maximum (HWFM) values, were extracted using Lorentz curve fitting following the background removal and are summarized in Table 1. The obtained d-spacing values were comparable with the d-spacing values of corresponding diffraction peaks in graphite (ICDD PDF card #03-065-6212), which are also included in Table 1 for comparison. There were noticeable deviations between these two sets of values due to obvious differences between both types of carbon. For the crystalline domain estimation, HWFM values of the peaks were analyzed using simply the Scherrer equation and assuming a standard value 0.9 for the shape factor. Such analysis of the (002) peak located at the 24.93 deg gives the domain size of 1.2 nm which represented a stack of approximately three carbon layers. Similar analysis of the (100) peak located at 43.56 deg yielded the value of 1.47 nm for the in-plane domain size.

Figure 7B:
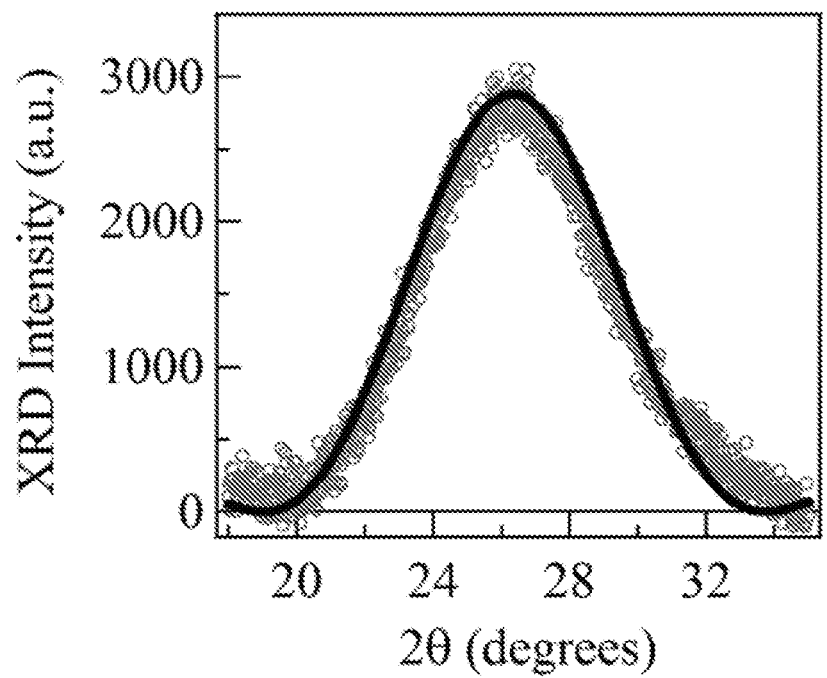

The number of stacked carbon layers was also analyzed using a second approach: the analysis of 002 XRD peak was carried out with the application of a model based on Scherrer equation and the Laue functions. This model expressed in equation (1) consists of a simple equation and few parameters such as layer spacing and layer coverage of graphene.

$$|F|^2 \propto |f(\theta)|^2 \left| \sum_{j=0}^{N} \beta_j e^{jka_j} \right|^2 \quad (1)$$

where, F is a structure factor, N is the number of graphene layer, f(θ) is an atomic scattering factor, and $$ka_j = \frac{4\pi d_j \sin(\theta)}{\lambda} \quad (2)$$

where, $d_j$ is a lattice spacing between $j^{th}$ and $(j-1)^{th}$ layer, θ is an angle between the incident ray and the scattering planes, λ is a wavelength of X-ray, and $\beta_j$ is an occupancy of $j^{th}$ graphene layer. The value of $\beta_j$ is between 0 and 1. FIG. 7B shows the experimental XRD profile (circles) corresponding to (002) reflection of graphene nanocages after background subtraction. Black solid line represents calculated results using fitting Eq. (1) with N=3, $d_j$=0.34 nm and $\beta_j$=1; j=1, 2, 3. Further, the mean dimension of the crystallite perpendicular to the plane of graphene samples $L_{002}$ can be determined using the familiar Scherrer equation:

$$L_{002} = \frac{k\lambda}{\beta \cos(\theta)} \quad (3)$$

where k=0.94 is the shape factor, β is the full width at half maximum given in radians, λ is a wavelength of X-ray, and θ is the angle between the incident ray and the scattering planes. Now the number of graphene layers N may be determined from the equation $L_{002}=(N-1)d_{002}$, where $d_{002}$ is the average distance between graphene planes. The analysis confirmed N~3, which is in agreement with the HWFM analysis. This is also consistent with the HRTEM study; however, direct imaging of the materials revealed that in addition to tri- there were also significant number of bi-layer nanocages.

TABLE 1

Peak analysis of XRD pattern of material synthesized at 600° C. after washing off nickel particles. Database values of graphite (ICDD PDF card # 03-065-6212) are included for comparison.

| 2θ (deg) | HWFM (deg) | d-spacing (Å) | L (nm) | hkl | graphite d-spacing (Å) |
|---|---|---|---|---|---|
| 24.93 | 6.75 | 3.57 | 1.20 | 002 | 3.35550 |
| 43.56 | 5.79 | 2.08 | 1.47 | 100 | 2.13389 |
| 79.78 | 9.17 | 1.20 | 1.08 | 110 | 1.23200 |

Figure 8A:
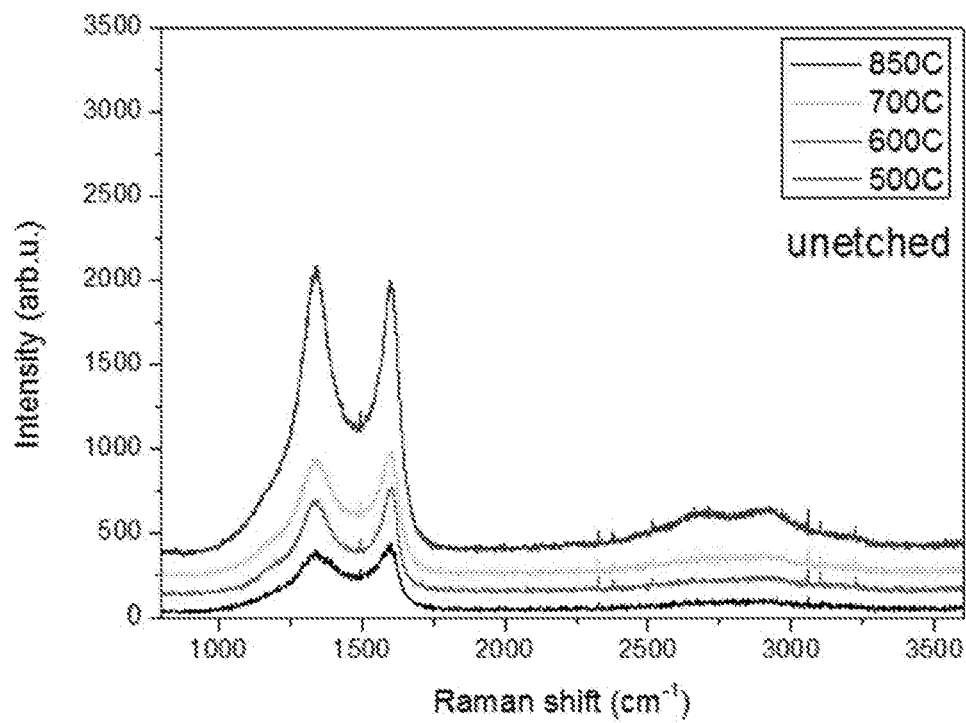
FIGS. 8A-8C are graphs showing Raman spectra of carbon nanocages of unetched (FIG. 8A) and etched (FIG. 8B) samples prepared at various temperatures, and (FIG. 8C) a graph showing the Raman spectrum of etched CNC sample prepared at 850° C. showing the spectral line fitting and assignments of main Raman features of graphene-related structure (red laser 632 nm, maximum power 17 mW).
Figure 8B:
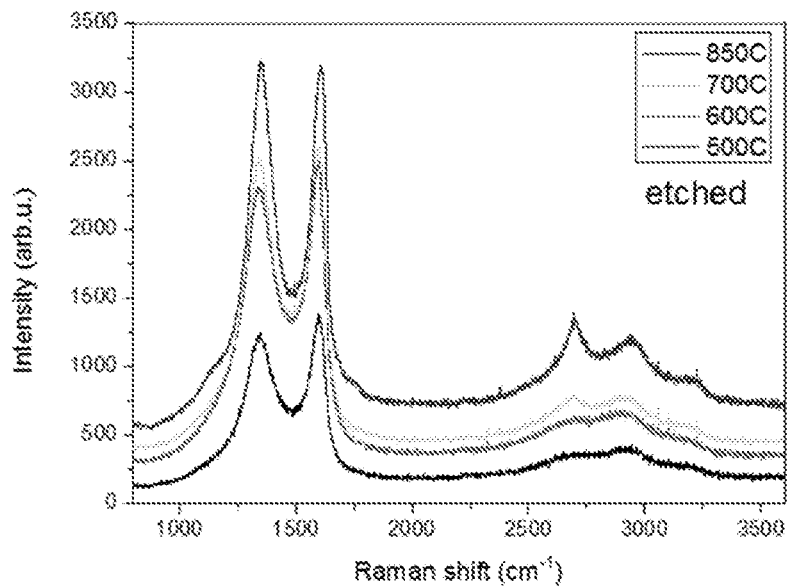
Figure 8C:
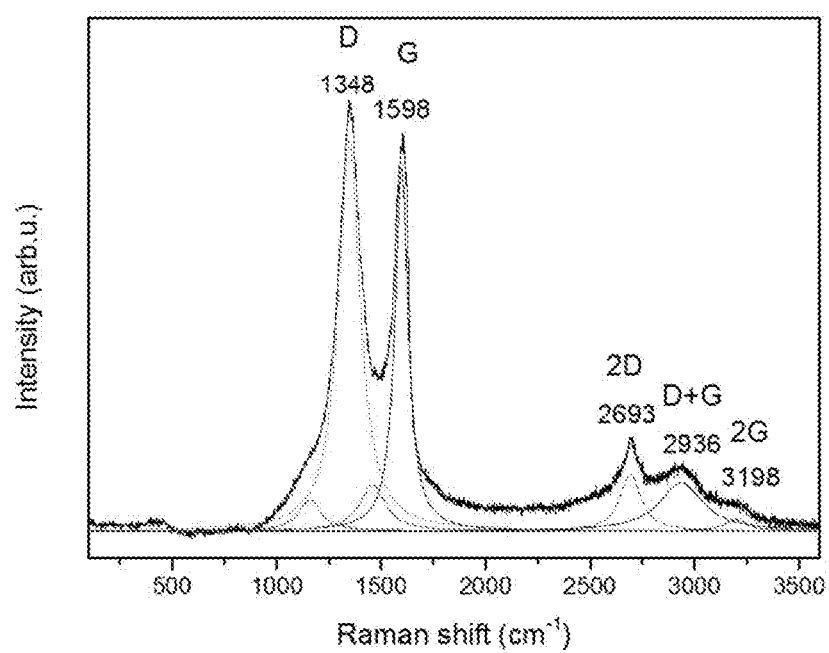

Raman spectroscopy was also conducted to further investigate structural details of synthesized CNCs materials. FIGS. 8A-8B show the evolution of Raman signal through unetched and etched samples depending on different annealing temperatures. A graphene-like structure started to be present at 700° C., but was better developed in higher temperature (850° C.) and remained intact in etched samples. The spectra of these CNC (FIG. 8C) consisted of five main bands located at 1348, 1598, 2693, 2936 and 3198 cm$^{-1}$. The one of two most intense features is the G band (FWHM~75 cm$^{-1}$) at 1598 cm$^{-1}$ which was present due to the doubly degenerate zone center (Γ point) $E_{2g}$ phonon mode. The second most intense D peak at 1348 cm$^{-1}$ (FWHM~130 cm$^{-1}$) was a first-order scattering from a zone-boundary (K point) phonon due to the breathing modes ($A_{1g}$ symmetry) of "honeycombed" carbon rings. At first, the D peak was assigned to diamond-like structures and corresponded to tetrahedrally-bonded atoms (in the sp$^3$ configuration). In a graphitic structure, the D peak was more likely activated by the high concentration of disordering caused by finite crystallite size, defects and folding. The 2D peak at 2693 cm$^{-1}$ was a second order phonon mode, which was an overtone of the D band (2×1348 cm$^{-1}$) [36,41,44] and in most cases indicated the existence of graphene structures. The broadness of this line (FWHM~120 cm$^{-1}$) was related to the folding of few graphene layers as expected for spherically shaped nanocages. The combination of D and G peaks is a feature located at 2936 cm$^{-1}$ and can be also induced by disorder; however, in some works it was assigned to the sp$^2$ and sp$^3$ C—H stretching vibrations. The next peak at 3198 cm$^{-1}$ was related to the overtone of the G band (2G). The weaker peak at 1159 cm$^{-1}$ could be related to the phonon at K point of graphite Brillouin zone or the line which appears in nanodiamond structures. The origin of the peak located between D and G bands at 1460 cm$^{-1}$ was not well understood. Some researchers attributed it to C═O vibrations of surface oxidized regions, whereas others assigned it to the phonon mode at M point in Brillouin zone. Below 700° C. Raman lines were much broader, especially in the spectral region 2500-3500 cm$^{-1}$ indicating high disorder character of carbonaceous structure in these samples. The appearance of relatively broad D and G bands and their overtones in CNC exhibiting graphene-like structure also indicated a significant degree of disorder, which was in agreement with XRD and TEM data.

Figure 9A:
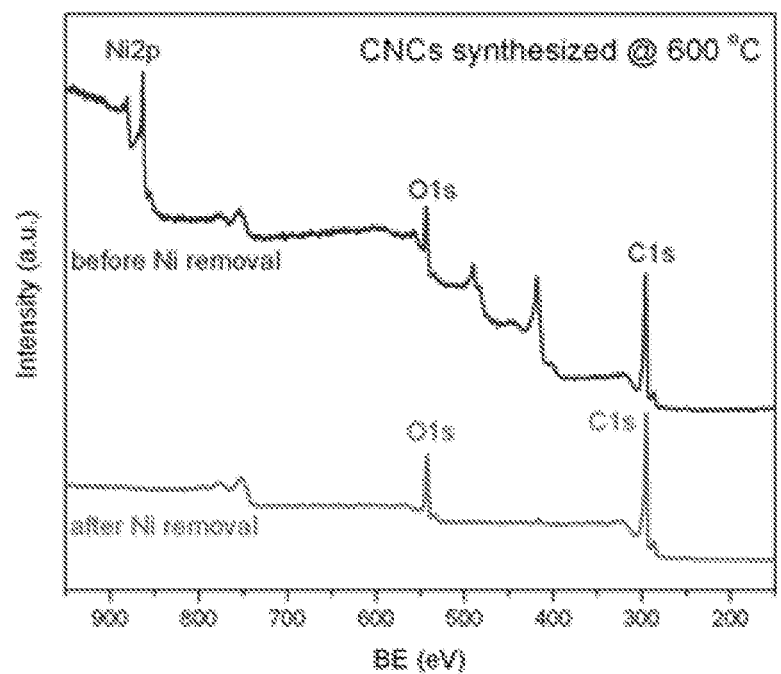
FIGS. 9A-9D are graphs showing XPS analysis of carbon nanocages synthesized at 600° C., including: graphs showing survey spectra before (FIG. 9A) and after (FIG. 9B) nickel removal.

In order to further analyze the structure and chemistry of carbon nanocages, X-Ray Photoelectron Spectroscopy (XPS) studies were conducted, before and after nickel dissolution, on a set of samples synthesized at 500° C., 550° C., 600° C. and 700° C., respectively. XPS was an effective method to obtain information about the composition and chemical state of the material, particularly of its few nanometer-thick surface layer and therefore, it was particularly useful to study carbon nanomaterials, where the structure, composition, and functionalization of the surface greatly affect material properties. Wide-scan survey XPS spectra of the presently disclosed carbon nanocages (shown in FIG. 9A for material synthesized at 600° C.) indicated the presence of C, O and Ni in the as-synthesized sample whereas, as expected, no Ni-related peaks were observed after acid-treatment and removal of nickel.

In addition to elemental composition, XPS could also be used to identify and quantify species of the same element in different chemical and bonding states. This was particularly useful for carbonaceous materials, which could exhibit a high variety of bonding and functionalization of carbon atoms. To attain this type of information for the present carbon nanocages, high-resolution spectra of carbon 1s region were measured and deconvoluted using XPSPEAK, free-domain XPS analysis software. For all samples, the Shirley-type baseline and a Gaussian peak curve profile was employed and the spectra were successfully deconvoluted into eight well-defined peak components, as summarized in FIG. 14 and Table 2. While the location and intensity of all component peaks were varied and optimized, constrain was employed to keep the same FWHM for all peaks. Furthermore, the same FWHM was used for all samples. The deconvolution analysis provided main six component peaks at binding energies of about 284.5, 285.5, 286.2, 287.6, 288.9 and 290.2 eV, which seemed to originate from sp$^2$-hybridized carbon (C═C), sp$^3$-hybridized carbon (C—C), hydroxyl or epoxy group (C—O), carbonyl group (C═O), carboxyl or carbonyl group (O—C═O/C═O) and carboxyl group (O—C═O), respectively. The origin of the remaining two weak peaks at 284.5 and 291.8 eV was not fully understood; however, the second one could be due to carbonate or $CO_2$.

TABLE 2

Parameters obtained from XPS C1s peak deconvolution for samples synthesized at 500° C., 550° C., 600° C., 700° C. before and after nickel dissolution.

| sample | Peak 1 ? BE (eV) | % | Peak 2 sp2 (C═C) BE (eV) | % | Peak 3 sp3 (C—C) BE (eV) | % | Peak 4 C—O BE (eV) | % | Peak 5 C═O BE (eV) | % | Peak 6 C═O/O—C═O BE (eV) | % | Peak 7 O—C═O BE (eV) | % | Peak 8 CO2 (?) BE (eV) | % |
|---|---|---|---|---|---|---|---|---|---|---|---|---|---|---|---|---|
| 500 C. | 282.90 | 1.8 | 284.50 | 59.2 | 285.55 | 6.3 | 286.23 | 17.2 | 287.60 | 7.2 | 289.02 | 3.5 | 290.15 | 3.6 | 291.80 | 1.2 |
| 550 C. | 282.90 | 1.4 | 284.50 | 52.2 | 285.40 | 4.6 | 286.23 | 25.2 | 287.66 | 8.1 | 288.94 | 2.7 | 290.15 | 5.0 | 291.90 | 0.9 |
| 600 C. | 282.90 | 0.9 | 284.50 | 42.8 | 285.45 | 1.5 | 286.25 | 35.1 | 287.63 | 10.4 | 288.99 | 2.3 | 290.15 | 6.8 | 292.02 | 0.3 |
| 700 C. | 282.57 | 0.9 | 284.50 | 45.0 | 285.40 | 3.4 | 286.31 | 29.7 | 287.66 | 9.9 | 288.94 | 3.6 | 290.26 | 6.2 | 292.02 | 1.2 |
| 500 C. etched | 283.04 | 1.8 | 284.50 | 59.6 | 285.45 | 4.8 | 286.23 | 13.5 | 287.60 | 7.8 | 288.88 | 7.1 | 290.34 | 3.5 | 291.80 | 1.8 |
| 550 C. etched | 283.01 | 2.5 | 284.50 | 48.5 | 285.40 | 7.3 | 286.12 | 19.8 | 287.45 | 8.2 | 288.55 | 8.9 | 289.98 | 4.3 | 291.70 | 0.6 |
| 600 C. etched | 282.98 | 1.6 | 284.50 | 58.0 | 285.45 | 4.3 | 286.21 | 16.8 | 287.60 | 8.3 | 288.94 | 5.5 | 290.25 | 3.7 | 291.70 | 1.8 |
| 700 C. etched | 282.99 | 1.3 | 284.50 | 46.9 | 285.80 | 3.9 | 286.24 | 25.9 | 287.58 | 9.6 | 288.90 | 4.8 | 290.15 | 6.3 | 291.72 | 1.4 |

Figure 9B:
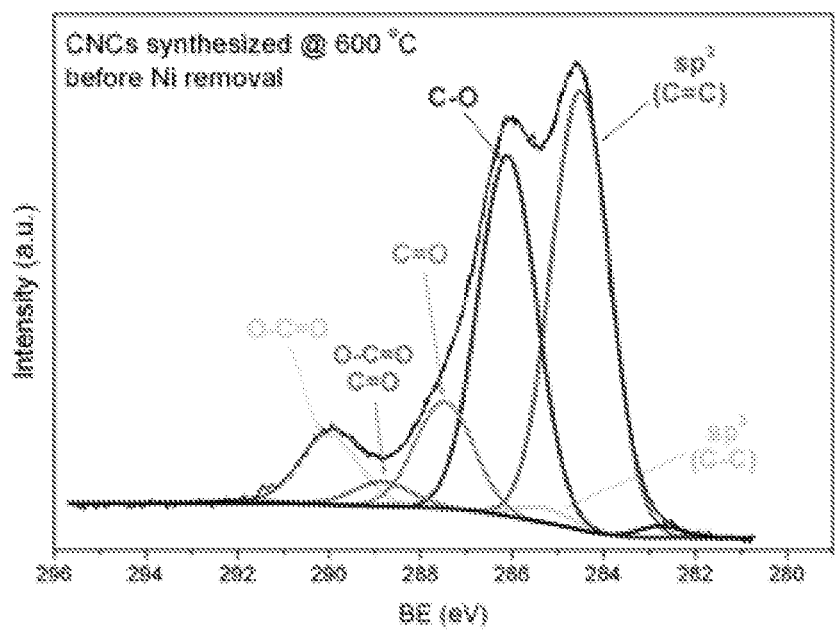
Figure 9C:
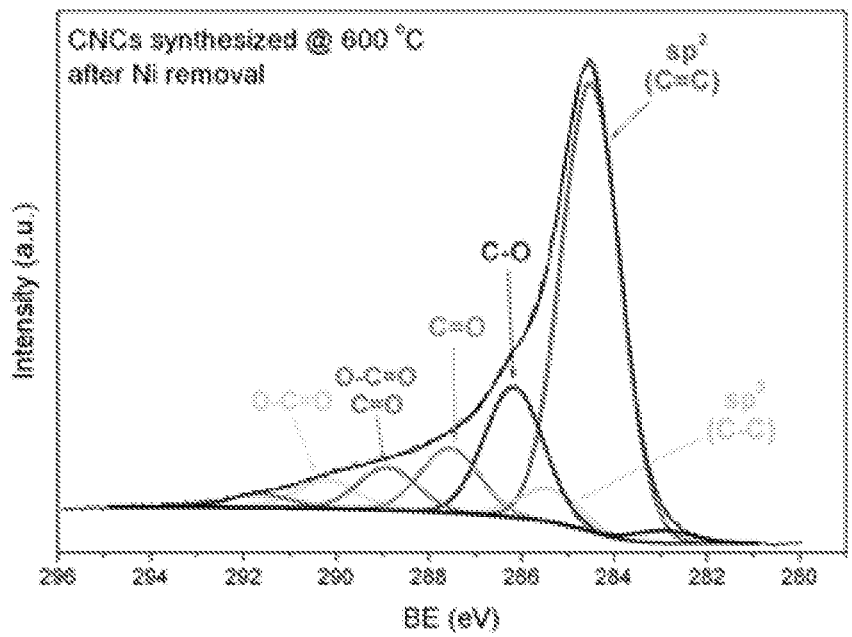
Figure 9D:
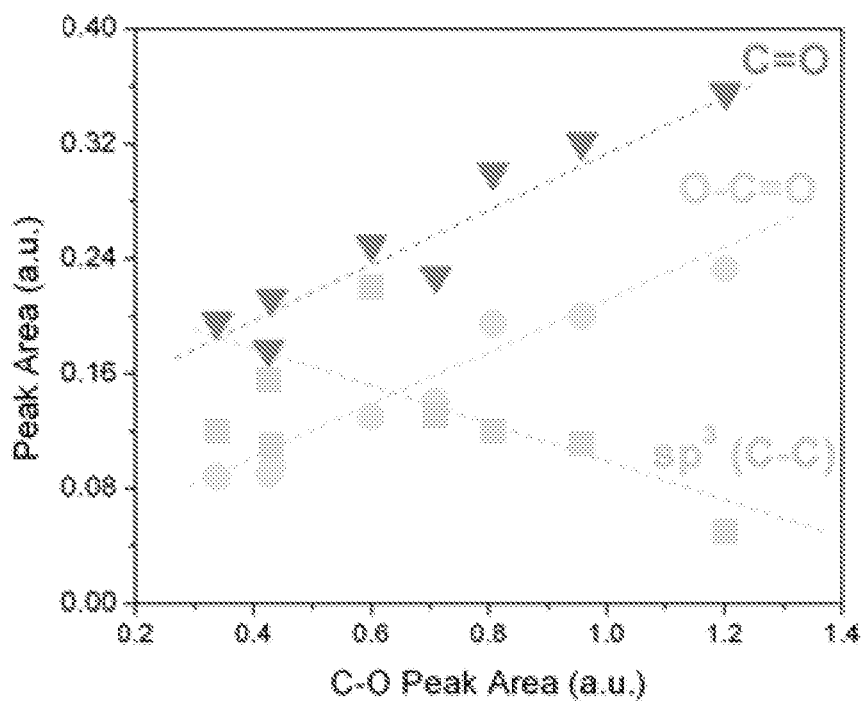
Figure 14:
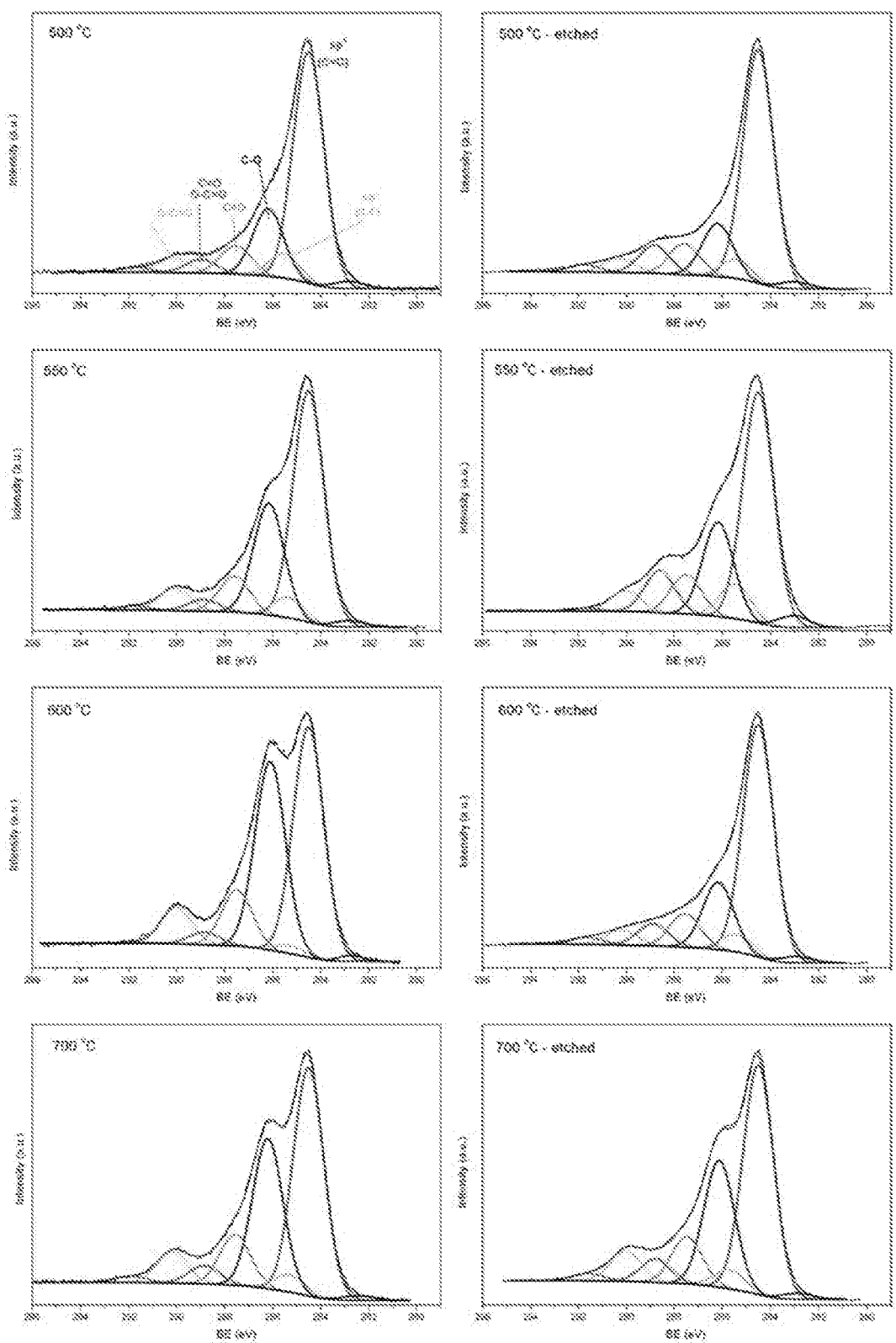
FIG. 14 includes graphs showing XPS C1s peak deconvolution for samples synthesized at 500° C., 550° C., 600° C. and 700° C. before and after nickel dissolution.
Figure 15:
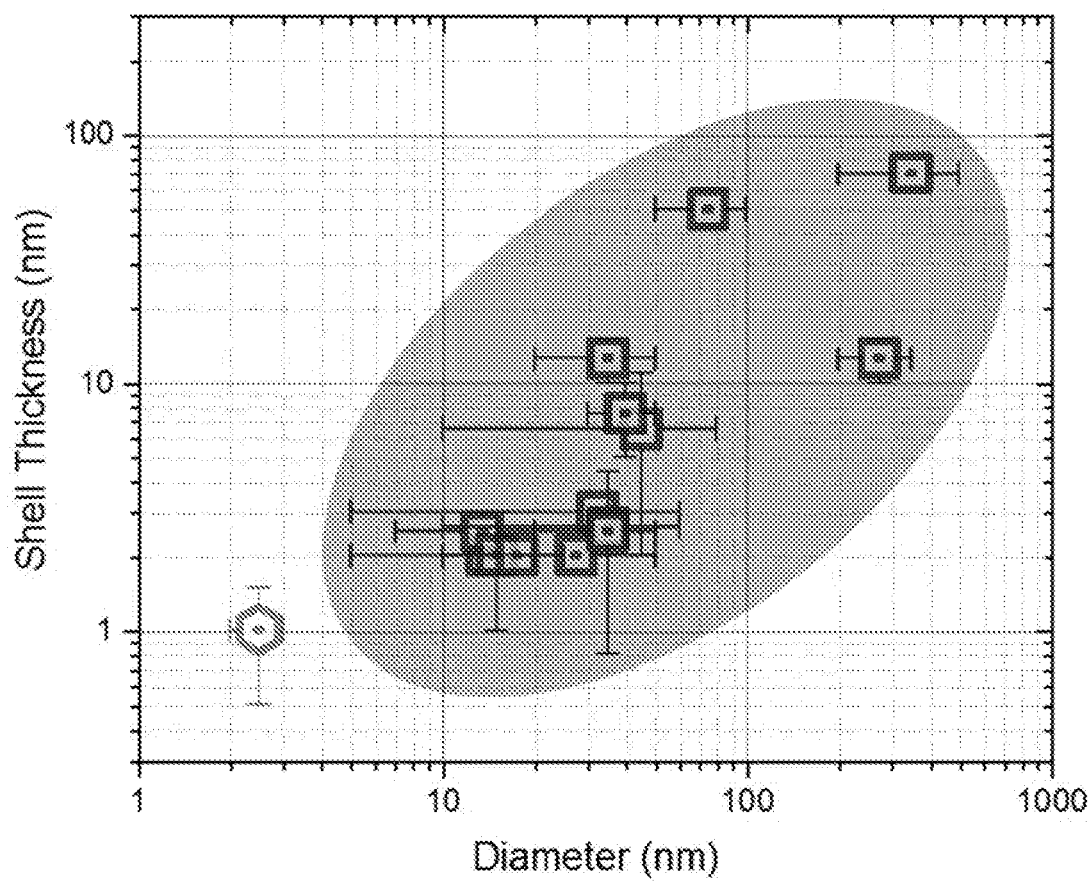
FIG. 15 includes a comparison of morphological parameters (diameter and shell thickness) of exemplary carbon nanocages of the present invention (hexagon) and carbon nanocages reported in the prior art obtained using other methods (squares).

Two observations could also be noticed based on data in Table 2. First, the intensity of the second strongest component, i.e., C—O peak located at 286.2 eV, was systematically lower in samples with Ni removed. This was best seen for material synthesized at 600° C. (FIGS. 9B-9C) but could be also noticed for other samples (FIG. 14). In fact, the intensity ratio between the sp$^2$ (at 284.5 eV) and C—O peaks increased from 3.4, 2.1, 1.2 and 1.5 in the as-synthesized materials to 4.4, 2.5, 3.4 and 1.8 in samples without nickel. Second, the data indicated that there was a strong linear-like correlation between the C—O and several other components, as shown in FIG. 9D. In particular, the C═O (i.e., 287. eV) and O—C═O (i.e., 290.2 eV) peaks increase with the increase of the C—O peak. At the same time the sp$^3$ (i.e. 285.5 eV) peak seems to decrease.

Figure 10A:
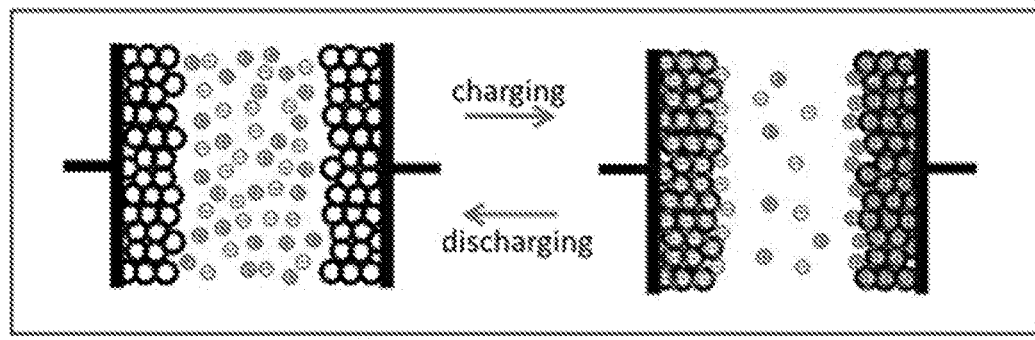
FIGS. 10A-10C show results of electrochemical performance of CNCs-600-F sample measured in a two electrode Swagelok cell configuration system using 1 M $H_2SO_4$ aqueous solution as the electrolyte including.
Figure 10B:
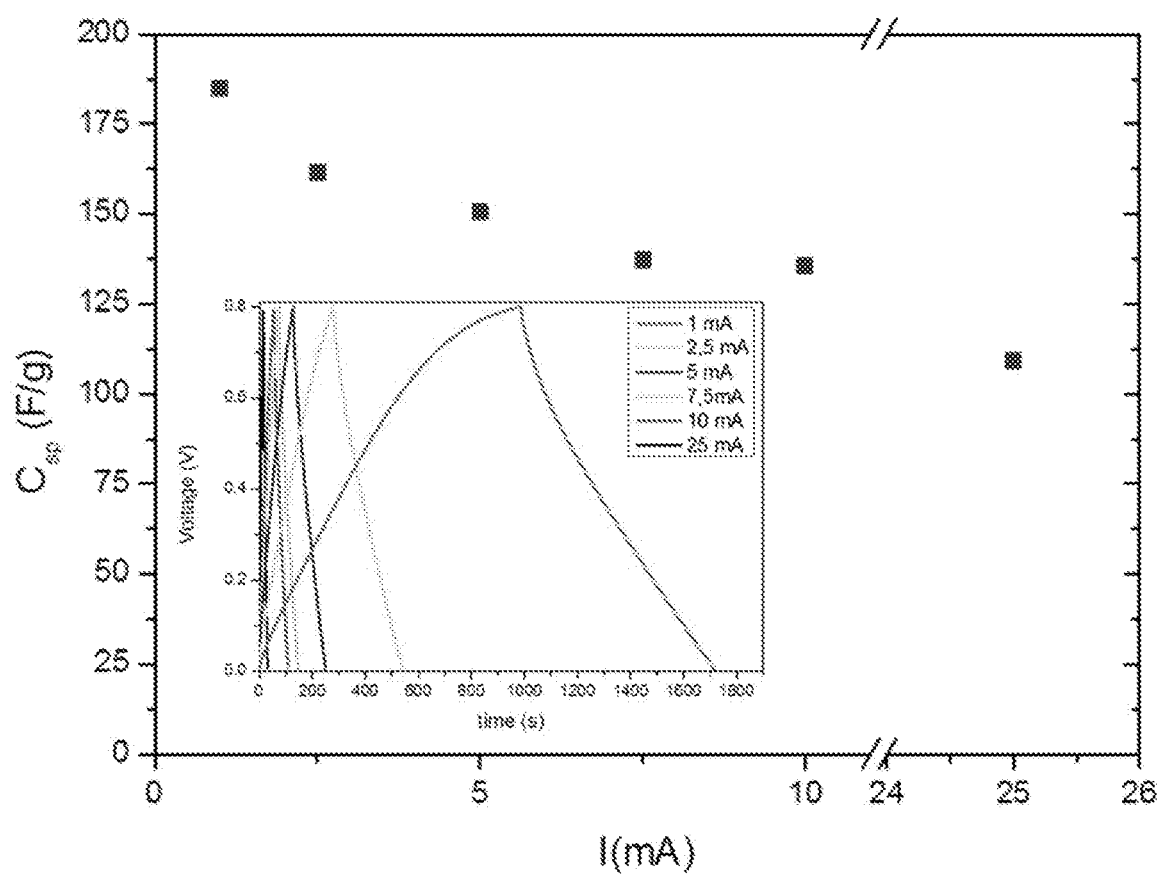
Figure 10C:
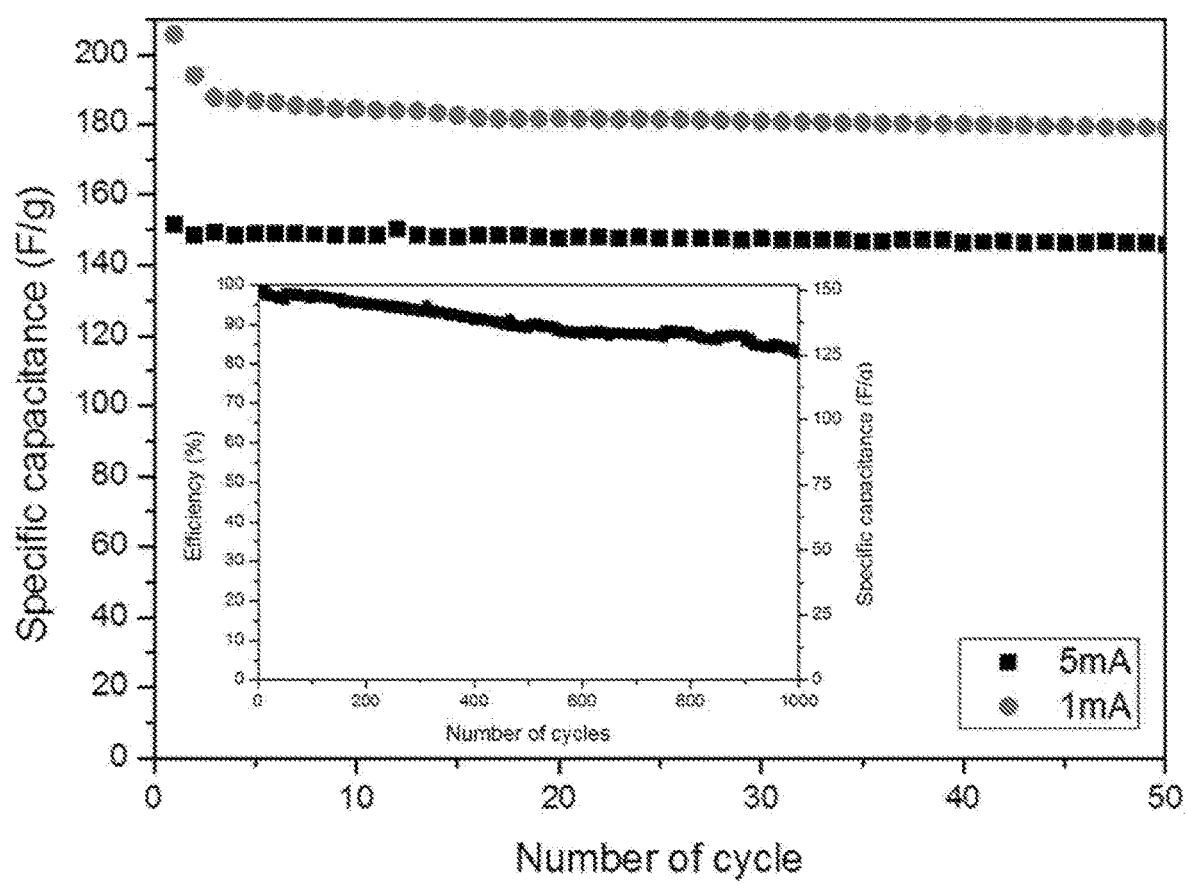

Electrochemical measurements are conducted for the use of nanocages as electrode material in supercapacitor structures. For this, the electrodes were prepared from the material synthesized at 600° C. after nickel removal. FIGS. 10A-10B show results of supercapacitor characteristics of the EDLC with both electrodes comprising carbon nanocages as the active material when the full cell is charged and discharged between 0 and 0.8 V at current densities between 90 m A g$^{-1}$ and 2.25 A g$^{-1}$. The observed almost linear voltage vs. time relation is characteristic of an electric double layer capacitance. There is a slight distortion of the curves presumably caused by the pseudo-capacitance of functional-groups. The specific capacitance of one electrode ($C_{sp}$) is calculated by the equation: $C_{sp}=4\times I\Delta t/m\Delta V$ where I, $\Delta t$, m, and $\Delta V$ are the applied current, discharge time, mass of the active material on two electrodes, and the voltage range, respectively. First cycle capacity of ~205 F g−1 stabilizes at ~180 F g−1 for over 50 cycles at the current density 90 mA g−1. The long cycling test shows that after 1000 cycles at 5 times higher current density the device maintains ~85% of its initial capacity. The specific capacitance of 205 F g$^{-1}$ is comparable with the highest values reported for any undoped carbon based material. A recent review on supercapacitor carbon electrodes ranks various carbons based on their specific capacity values. Although, there are some materials that exhibit values higher than approximately 300 F g$^{-1}$, those materials have either a very complicated nanocomposite structure and require extensive fabrication methods or have their high values originated from significant nitrogen doping and pseudocapacitance. The high double-layer capacitance of the presently-disclosed material can directly be evaluated by comparing it with other undoped graphene-like carbons with similar specific surface area (SSA). Since the measured double-layer capacitance on one side of graphene layer is estimated at 21 μF cm$^{-2}$ and its theoretical SSA (total from both sides) is 2630 m$^2$ g$^{-1}$, the gravimetric specific double-layer capacitance of monolayer graphene is about 550 F g$^{-1}$. Double-layer capacitance of undoped graphene-like structures should relate to this value by a simple factor of specific surface area ratio between the material and monolayer graphene. The presently-disclosed CNCs follow that trend and almost reach the theoretical value for a bilayer graphene.

Carbon nanocages produced in the 600° C. synthesis experiments had nearly spherical morphologies, uniform internal diameters of about 2.5 nm and they formed a three-dimensional densely-packed network structure. Hence, a simplified model of densely-packed truncated octahedrons (FIG. 13a), which are the only space-filling polyhedrons besides cubes, was proposed to describe the relationship between geometrical parameters and shell thickness and to interpret specific surface area values measured from BET.

Figure 13B:
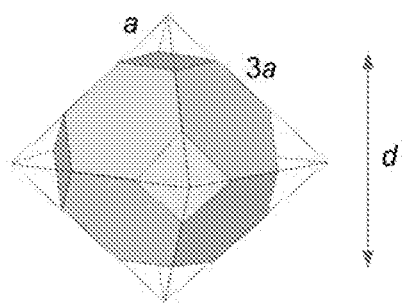

In order to mathematically describe the model, it was worth noticing that a truncated octahedron with edge length could be constructed from a regular octahedron with side length 3a by removing its six right square pyramidal corners (FIG. 13B). The surface area $A_1$ of the resultant truncated octahedron could then be expressed as:

$$A_1 = (6+12\sqrt{3})a^2$$

and it could be further modified by using the following relationship between the edge length a and the diameter d (defined as shown in FIG. 13B), which represented the diameter of the nanocage, by:

$$a = \frac{d}{2\sqrt{2}}$$

The surface area $A_1$ could then be expressed as:

$$A_1 = \frac{(3+6\sqrt{3})}{4}d^2$$

Knowing the mass of the samples m and the specific surface area of a single graphitic sheet, i.e. of a single layer of graphene $S_{graphene}$=2630 m$^2$/g (taking into account the surface area on both sides of the sheet) one could then calculate the total surface area ($A_{total}$) of a single graphitic layer that could be formed from the total carbon in the sample:

$$A_{total}=S_{graphene}m$$

Considering the number of carbon layers n between neighboring nanocages (which was directly related to the shell thickness) and assuming that the separation between carbon layers x was the same as in graphite x=0.335 nm, one could express $A_{total}$ of as the total number of nanocages $N_d^n$:

$$A_{total} = A_1 N_d^1$$

$$A_{total} = 2A_1 N_d^2$$

$$A_{total} = 2A_1 N_d^3 + A_1 N_d^3 \left(\frac{d+x}{d}\right)^2$$

$$A_{total} = 2A_1 N_d^4 + 2A_1 N_d^4 \left(\frac{d+x}{d}\right)^2$$

$$A_{total} = 2A_1 N_d^5 + 2A_1 N_d^5 \left(\frac{d+x}{d}\right)^2 + A_1 N_d^5 \left(\frac{d+2x}{d}\right)^2$$

$$A_{total} = 2A_1 N_d^6 + 2A_1 N_d^6 \left(\frac{d+x}{d}\right)^2 + 2A_1 N_d^6 \left(\frac{d+2x}{d}\right)^2$$

Assuming that the surface area $A_{BET}^n$ measured by BET was equal $A_{BET}^n=A_1 N_d^n$ (i.e., only the internal surface of the nanocage is available for gas adsorption), the specific surface area for different number of layers between nanocages could be calculated as a function of the nanocage diameter. The results of such calculations are shown for models between 1 and 5 layers and 3 different nanocage nanometers and are plotted in FIG. 6.

Example 2

The following example is an exemplary method of preparing N-doped carbon nanocages (N—CNCs) based on a simple and low cost one-step synthesis method. As described below, by tuning the mass ratio of reagents the size control can be obtained. The high catalytic activity of N—CNCs was verified by measuring the activity electrochemically. Transmission electron microscopy (TEM) was used to investigate the microstructure and morphologies of the N-doped CNC samples. The surface chemistry of the n-CNCs was also analyzed using X-ray photoelectron spectroscopy (XPS), with the structure of the carbon shells of the N—CNCs characterized by Raman spectroscopy.

Materials and Methods

Synthesis Method.

The novel method of N-doped carbon is performed based on a simple and low cost one-step synthesis method. Nickel acetate and caffeine powders were used as carbon nanocages precursors. Both powders were dissolved in distilled water at 60° C. (between 50° C. to 80° C.). Then the solution was dried at 90° C. (between 50° C. to 150° C.) and grounded in an agate mortar. The as-prepared powder precursor was further annealed in a furnace at 600° C. (between 450° C. to 1200° C.) and a nitrogen gas atmosphere, although other inert gases such as argon or a mixture with hydrogen could be used as well. Nickel particles were then removed from carbon nanocages using nitric acid. Then, the CNCs were washed with distilled water to remove the residue of nitric ions until a pH 7 was obtained. The final product was then dried at temperatures below 150° C.

Without wishing to be bound by any particular theory or mechanism, it was believed that there were a variety of different types of organic precursors that could serve as nitrogen source in this synthesis. Any amides, such as urea or acetaminophen, or any nitrogen contained alkaloids, such as caffeine, theophylline, or other purines, or other nitrogen-containing heterocycles, such as diazines, triazines, or hydrolyzed acids thereof, were believed to be capable of being used. Also, it was believed that there were various nickel compounds which might be used as a nickel source, including any nickel salts which could dissolve in a particular solvent used for preparation of the precursor. Citric acid could be used as a chelating agent and gel precursor.

By tuning the mass ratio of reagents, size control can be obtained for the N—CNCs. The materials shown as examples herein were obtained using 1:1 weight and molar ratios between caffeine and Ni acetate.

Electrocatalysis.

The high catalytic activity of N—CNCs was verified by measuring the activity electrochemically in acidic media (0.5 M $H_2SO_4$) and comparing with Pt, and undoped CNCs. Electrochemical measurements were conducted from the N—CNCs synthesized at 600° C. after removal of nickel nanoparticles. The experiments were performed in a customized H-type electrochemical cell which contained a working electrode (N—CNCs), a counter electrode (Pt mesh), and a proton exchange membrane. An ion exchange membrane (Selemion AMV) separated the cathode and anode compartments to prevent oxidation of the reduction products at the anode. The cathode compartment also contained a port to position the Ag/AgCl (3.0M KCl) reference electrode in the center. Potentiostatic Electrochemical Impedance Spectroscopy (EIS) measurements were performed before every HER experiment to determine the uncompensated solution resistance, $R_u$, and the potentiostat subsequently compensated for 85% of $R_u$ during electrolysis. The produced hydrogen was quantified by using a gas chromatography system consisting of an automatic valve injection (1 mL sample), a thermal conductivity detector (TCD), and a flame ionization detector (FID). Ultra-high purity nitrogen gas (99.99%, Specialty Gases) was used as the carrier gas to identify $H_2$.

Material Characterization.

The microstructure and morphologies of the N-doped CNC samples were investigated using transmission electron microscopy (TEM) in FEI Tecnai F20 operated at 200 kV. Several TEM-based techniques, including high-resolution transmission electron microscopy (HRTEM), and selected area electron diffraction (SAED) were employed to analyze these samples. TEM specimens were prepared by dispersing the precursor powder onto gold grids-supported holey carbon films. The Brunauer-Emmett-Teller (BET) specific surface area was determined from nitrogen adsorption-desorption isotherms using a Micromeritics Tri Star 3000 system.

The surface chemistry was analyzed using X-ray photoelectron spectroscopy (XPS) in VG Thermo-Scientific MultiLab 3000 ultra-high vacuum surface analysis system. For the deconvolution of C1s XPS spectra a Shirley-type baseline and a Gaussian peak curve profile, with the same full width at half maximum (FWHM) for all components and all samples, were used. The structure of carbon shells of the N—CNCs was characterized by Raman spectroscopy (Renishaw inVia Raman system) using HeNe laser (wavelength: 633 nm; maximum power: 17 mW) in a spectral range of 300-3600 $cm^{-1}$. The Raman spectra were fitted using Lorentzian functions.

Results and Discussion

Electrocatalytic HER Activity of N—CNCs.

Figure 16:
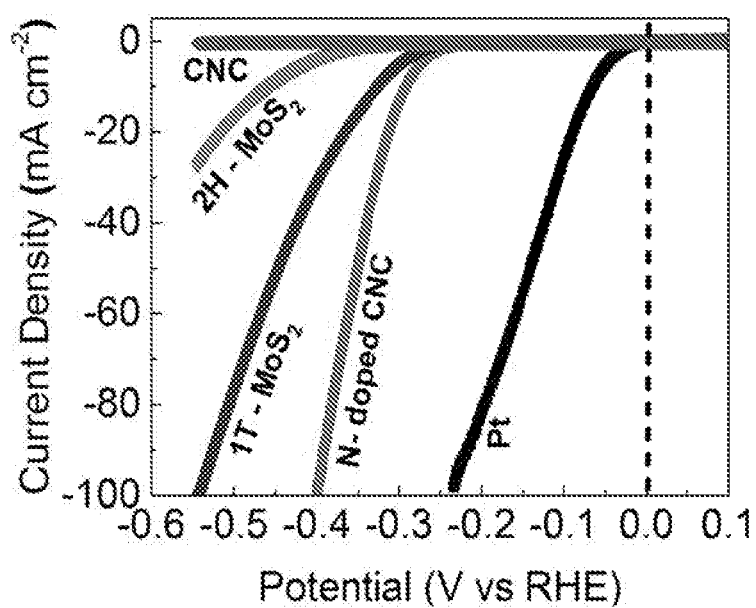
FIG. 16 shows the J-V curves for Pt, N—CNCs and CNCs and $MoS_2$ catalysts (2H and 1T types), with the Nitrogen doped carbon nanocages showing exceptionally high HER catalytic activity and achieving $-100$ mA/cm$^2$ current density only at $\sim -0.4$V vs RHE.

FIG. 16 shows the J-V curves for Pt, N—CNCs and CNCs and $MoS_2$ catalysts (2H and 1T types). As expected, CNCs did not exhibit any catalytic activity as a current density of less than −10 $mA/cm^2$ was obtained even at high working potential, i.e., −0.7 V vs RHE. Similar results were also obtained for carbon paper. Interestingly, N—CNCs showed exceptionally high HER catalytic activity and achieve a 100 $mA/cm^2$ current density only at approximately −0.4V versus RHE. Similar current density was achieved approximately at −0.3 V vs RHE when N—CNCs was replaced by Pt. The results indicated that N—CNCs were highly competitive to a Pt HER catalyst. Moreover, it was believed that the performance of the N—CNCs can further be improved by optimizing the size of cages, the doping level, and by introduction of co-dopants, such as sulphur, phosphorus, boron, etc.

Morphology and Correlation Study on N-Doped CNC Surface Area with Graphene.

To study morphology, including carbon shell thickness and nickel nanoparticles size, of N-doped CNCs, transmission electron microscopy was utilized. The TEM images revealed that the nickel particles have an average size of about 7 nm (FIG. 17A) and a broad size distribution from 2 to about 100 nm. The carbon shell thickness was found to be about 4-7 graphitic layers depending on the size of a host Ni particle; the bigger the nickel particle, the higher the number of layers coating it. After etching in an acidic media the nickel nanoparticles were removed leaving empty nanocages as shown in FIG. 17B. This process develops the active surface area in the material, which can be evaluated from the BET nitrogen adsorption-desorption isotherm method (FIG. 17C). Using this method, the BET specific surface area (SSA) was measured at 566 $m^2$ $g^{-1}$ and the adsorption average pore width was estimated at 7 nm. As known, the theoretical SSA of a monolayer graphitic sheet is 2630 $m^2$ $g^{-1}$ (total from both sides). Considering that the presently-disclosed N-doped material has the average pore size of 7 nm and each nanocage contains about 4-5 graphitic atomic layers, its SSA matches the theoretical value for 4-7 L graphite (i.e., it falls between the 657 and 375 $m^2$ $g^{-1}$ theoretical limits). The BET-derived pore size distribution shows a variety of pore sizes; however, the majority of pores have a mesoporous morphology. Similar results were obtained from TEM imaging.

Study on Doping of N-Doped CNCs.

Figure 18A:
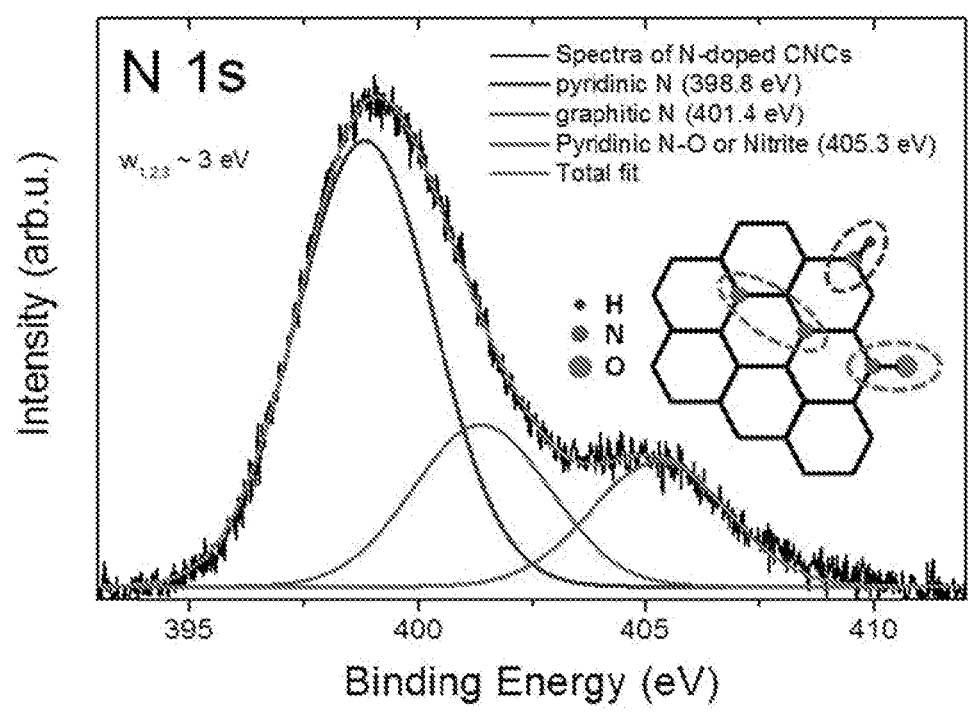
FIGS. 18A-18B include graphs showing spectra of N-doped CNCs.
Figure 18B:
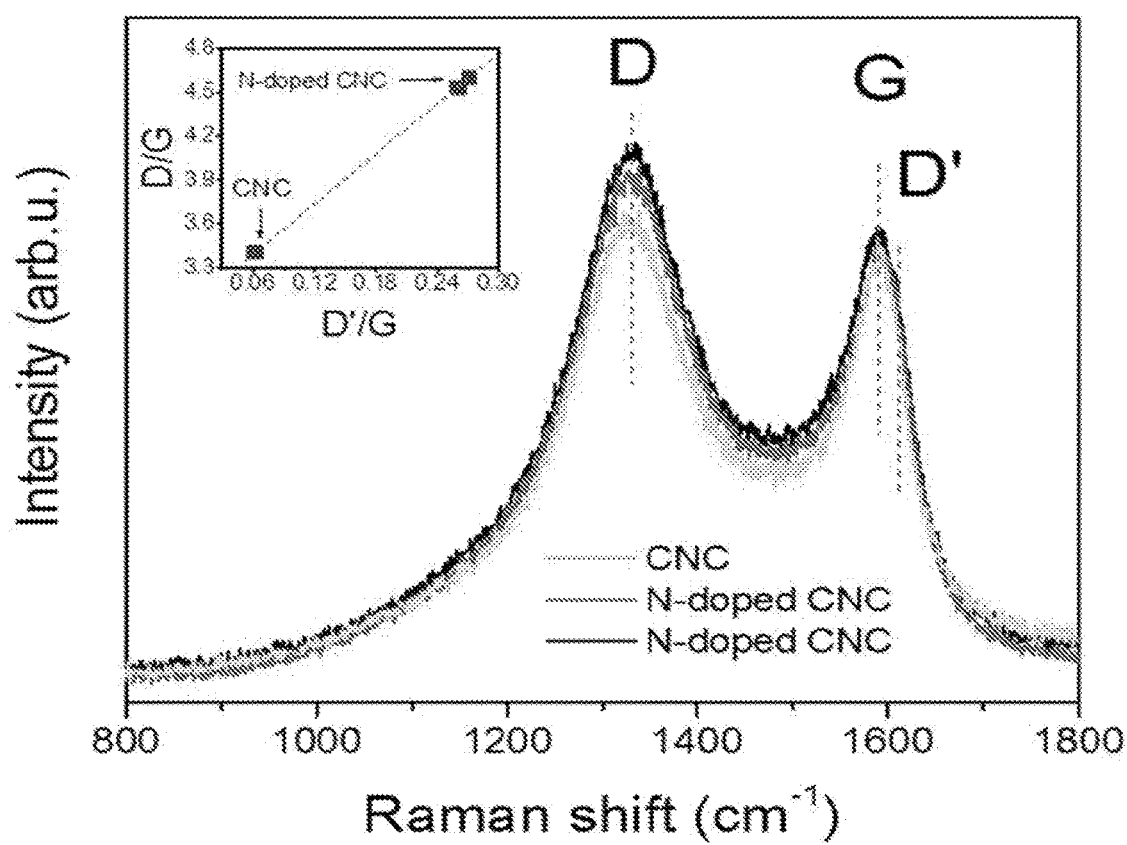

The presence of nitrogen and confirmation of the reaction mechanism was studied by the XPS analysis. It was verified that the reaction lead to the N doping at an approximately 5% level with the dopants substituted at the desired carbon sites (FIG. 18A). High resolution XPS analysis confirmed that about 60% of the nitrogen atoms were located at pyridinic sites (396.5 eV) as schematically shown in the inset of FIG. 18A. It should be mentioned that different types of nitrogen species (e.g., pyridine, graphitic, etc.) exhibit entirely different degrees of catalytic activity. In a previous study, it was shown that pyridinic nitrogen in carbonous materials is mainly responsible for the catalytic activity of the N-doped carbon structure. This explained why the instant N—CNCs containing a high percentage of pyridinic nitrogen exhibited a high catalytic activity. Additionally, due to the small sizes of the nanocages in the materials, there was a highly active surface area that was easily accessible for electrochemical reactions.

A Raman study was used to investigate the carbon structure of the materials. The G band at 1585 cm$^{-1}$ appeared to be due to the doubly-degenerated zone center (Γ point) $E_{2g}$ phonon mode. The D peak at 1328 cm$^{-1}$, was a first-order scattering from a zone-boundary (K point) phonon due to the breathing modes ($A_{1g}$ symmetry) of "honey-combed" carbon rings and was also often assigned to tetrahedrally-bonded carbon atoms in diamond-like structures. However, in graphitic structures, the D peak was more likely activated by high degree of disorder caused by finite crystallite size, defects and folding. In the presently-disclosed material, the high D band appeared most likely to be due to the small sizes of nanocages and their high curvature (the calculated nanographite crystallite size, $L_a$, is about 10 nm). A study on $I_D/I_G$ ratio revealed that the degree of disorder was increased in N-doped samples and remained constant for the present N-doped set of materials. D'-band, which might originate from intravalley double resonance scattering processes, appeared as a shoulder peak of the G band (1612 cm$^{-1}$). The occurrence of the D' line is strongly correlated with the N-doping and observed for other carbonaceous materials (e.g. graphene). As expected, the $I_D/I_G$ ratio significantly increased for N—CNC samples.

Figure 19:
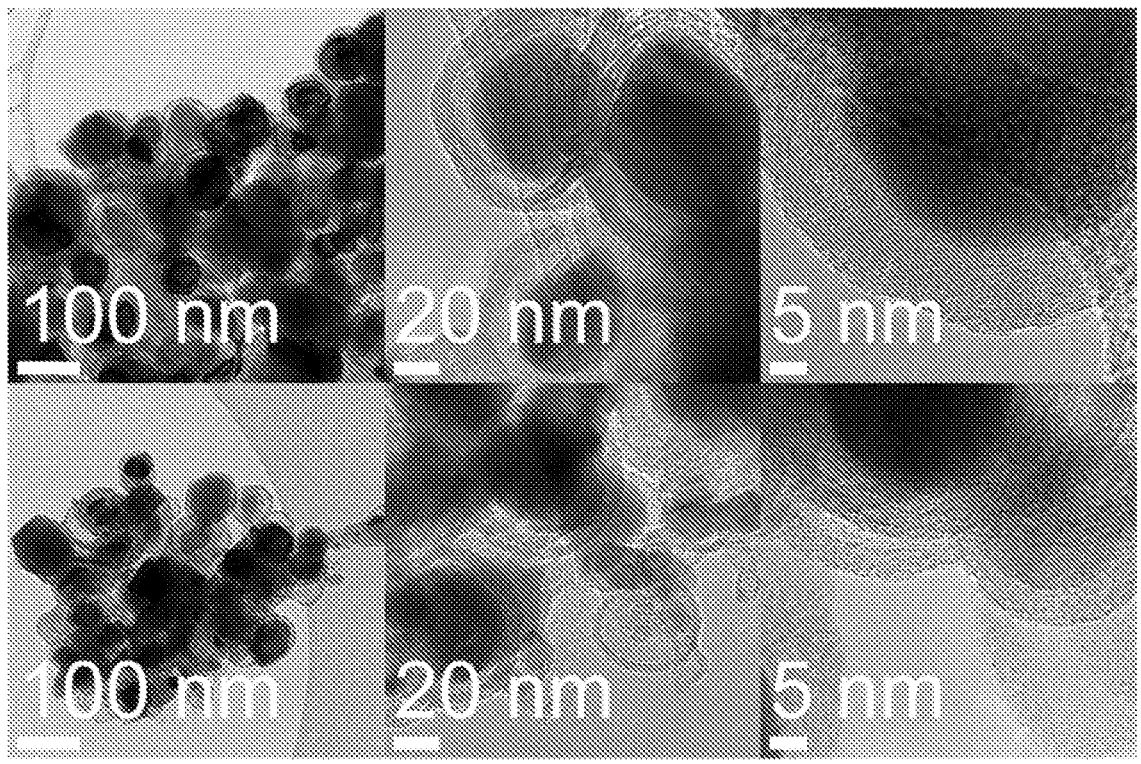
FIG. 19 includes TEM images showing tuning of N—CNC size by using different Nitrogen source (N-doping by urea). The upper TEM images are of 1:2 weight ratio nitrogen and carbon precursor:nickel salt, and the lower images are of 1:3 weight ratio nitrogen and carbon precursor:nickel salt.

FIG. 19 shows the N—CNC size tuning method by using other N-containing precursor (urea). In the case ca. 50 nm nickel particles, the N—CNC thickness is ca. 25-30 graphitic layers (approximately 10 nm). In general, the lower molar mass of the N and C precursor compare with Ni salt mass, the bigger Ni particles and CNC thickness that will be obtained.

Summary

In summary, the foregoing experiments demonstrated a scalable method for producing bulk quantities of carbon nanocages. One process involved mixing of equal proportions of Ni acetate and citric acid in aqueous medium followed by oven drying. Annealing of precursor powders caused thermolysis of nickel acetate, resulting in Ni nanoparticles which served as a template for carbon nanocages. Carbon nanocages formed on the Ni nanoparticles by a dissolution and precipitation mechanism. After removal of Ni particles by acid dissolution, the interconnected network of nanocages was left intact. TEM and STEM studies clearly revealed stability of nanocages when treated at higher temperatures. Low temperature synthesis showed a uniform bi- and tri-layer of graphene nanocages. As the annealing temperature increased, the number of layers also tended to increase. The nanocages showed high surface area and electrochemical studies also showed high capacitance and good performance. Without wishing to be bound by any particular theory, it was believed that the presently-described approach was thus a scalable alternative method of producing 3D graphene nanocages in large quantities which can be used in energy storage and biomedical applications.

The above examples also show that N—CNCs can be synthesized directly in a one-step synthesis process with a controlled tunability of nitrogen doping level and size of cages. The method involved only one annealing step over an entire synthesis process since doping was obtained in-situ during pyrolysis (i.e., during the carbonization reaction). Additional functional groups could be incorporated into the carbon structure, which increased active site numbers as a further improvement of such material. Further, tuning the mass ratio of reagents used could control the size of the resulting doped CNCs. N—CNCs showed exceptionally high HER catalytic activity and achieve −100 mA/cm$^2$ current density only at approximately −0.4 V versus RHE. Similar current density was achieved approximately at −0.3 V versus RHE when N—CNCs was replaced by Pt. The results indicated that N—CNCs were highly competitive to Pt HER catalysts. Performance of the N—CNCs could further be improved by optimizing the size of cages, the doping level, and by introduction of co-dopants, such as sulphur, phosphorus, boron, etc. The BET-derived pore size distribution showed a variety of pore sizes however, the majority of pores has a mesoporous morphology. Similar results were obtained from TEM imaging. The small sizes of the nanocages of the presently-disclosed material provided a high active surface area easily accessible for electrochemical reaction.

Throughout this document, various references are mentioned. All such references are incorporated herein by reference, including the references set forth in the following list:

REFERENCES

1. Simon, P. and Y. Gogotsi, *Materials for electrochemical capacitors*. Nature Materials, 2008. 7(11): p. 845-854.
2. Staaf, L. G. H., P. Lundgren, and P. Enoksson, *Present and future supercapacitor carbon electrode materials for improved energy storage used in intelligent wireless sensor systems*. Nano Energy, 2014. 9: p. 128-141.
3. Xie, K., et al., *Carbon Nanocages as Supercapacitor Electrode Materials*. Advanced Materials, 2012. 24(3): p. 347-+.
4. Zhu, Y., et al., *Carbon-Based Supercapacitors Produced by Activation of Graphene*. Science, 2011. 332(6037): p. 1537-1541.
5. Miller, J. R., R. A. Outlaw, and B. C. Holloway, *Graphene Double-Layer Capacitor with ac Line-Filtering Performance*. Science, 2010. 329(5999): p. 1637-1639.
6. Miller, J. R. and P. Simon, *Materials science—Electrochemical capacitors for energy management*. Science, 2008. 321(5889): p. 651-652.
7. Futaba, D. N., et al., *Shape-engineerable and highly densely packed single-walled carbon nanotubes and their application as super-capacitor electrodes*. Nature Materials, 2006. 5(12): p. 987-994.
8. Xu, B., et al., *Competitive effect of KOH activation on the electrochemical performances of carbon nanotubes for EDLC: Balance between porosity and conductivity*. Electrochimica Acta, 2008. 53(26): p. 7730-7735.
9. Ruiz, V., et al., *An activated carbon monolith as an electrode material for supercapacitors*. Carbon, 2009. 47(1): p. 195-200.
10. Gryglewicz, G., et al., *Effect of pore size distribution of coal-based activated carbons on double layer capacitance*. Electrochimica Acta, 2005. 50(5): p. 1197-1206.
11. Wang, K., et al., *Mesoporous Carbon Nanofibers for Supercapacitor Application*. Journal of Physical Chemistry C, 2009. 113(3): p. 1093-1097.
12. Xu, B., et al., *Highly mesoporous and high surface area carbon: A high capacitance electrode material for EDLCs with various electrolytes*. Electrochemistry Communications, 2008. 10(5): p. 795-797.
13. Xing, W., et al., *Superior electric double layer capacitors using ordered mesoporous carbons*. Carbon, 2006. 44(2): p. 216-224.

14. Stoller, M. D., et al., *Graphene-Based Ultracapacitors*. Nano Letters, 2008. 8(10): p. 3498-3502.
15. Wang, Y., et al., *Supercapacitor Devices Based on Graphene Materials*. Journal of Physical Chemistry C, 2009. 113(30): p. 13103-13107.
16. Zhang, L. L., R. Zhou, and X. S. Zhao, *Graphene-based materials as supercapacitor electrodes*. Journal of Materials Chemistry, 2010. 20(29): p. 5983-5992.
17. Wang, X. X., et al., *Carbon nanocages: A new support material for Pt catalyst with remarkably high durability*. Scientific Reports, 2014. 4: p. 4437.
18. Chen, S., et al., *Nitrogen-Doped Carbon Nanocages as Efficient Metal-Free Electrocatalysts for Oxygen Reduction Reaction*. Advanced Materials, 2012. 24(41): p. 5593-5597.
21. Wang, W. and D. Yuan, *Mesoporous carbon originated from non permanent porous MOFs for gas storage and CO2/CH4 separation*. Scientific Reports, 2014. 4: p. 5711.
22. Guangda Li et al., *Synthesis, characterization and application of carbon nanocages as anode materials for high-performance lithium-ion batteries*, RSC Advances, 2012. 2: p 284-291.
23. Yanwen Ma et al., *A practical route to the production of carbon nanocages*, Carbon, 2005. 43(8): p. 1667-1672.
24. Mitchell, D. R. G., *DiffTools: Electron diffraction software tools for DigitalMicrograph™*. Microscopy Research and Technique, 2008. 71(8): p. 588-593.
25. Lochel, B. P. and H. H. Strehblow, *Breakdown of Passivity of Nickel by Floride II. Surface Analytical Studies*. Journal of the Electrochemical Society, 1984. 131(4): p. 713-723.
26. Mansour, A. N., *Nickel Monochromated Al Kα XPS Spectra from the Physical Electronics Model 5400 Spectrometer*. Surface Science Spectra, 1994. 3(3): p. 221-230.
27. Mohamed, M. A., S. A. Halawy, and M. M. Ebrahim, *Nonisothermal Decomposition of Nickel acetate Tetrahydrate*. Journal of Analytical and Applied Pyrolysis, 1993. 27(2): p. 109-118.
28. L. Baraton et al., *On the mechanisms of precipitation of graphene on nickel thin films,* 2011. Europhysics letters, 2011. 96 (46003): p. 1-5.
29. Oya, A. and S. Otani, *Catalytic Graphitization of Carbons by Various Metals*, Carbon, 1979. 17(2): p. 131-137.
30. A. Baldan, *Review Progress in Ostwald ripening theories and their applications to nickel-base superalloys Part I: Ostwald ripening theories*, Journal of Materials Science, 2002. 37(11): p. 2171-2202.
31. Pacley Shanee Danyale, *Investigation of the behavior of the nickel catalyst in chemical vapor deposition synthesis of carbon nanopearls*, Ph.D. Theses, University of Dayton, 2012.
32. B. D. Cullity and S. R. Stock, Elements of X-ray Diffraction, 3'nd Edition (2001), Addison Wesley.
33. Bokhonov, B. and M. Korchagin, *The formation of graphite encapsulated metal nanoparticles during mechanical activation and annealing of soot with iron and nickel*. Journal of Alloys and Compounds, 2002. 333(1-2): p. 308-320.
34. F. Tuinstra and J. L. Koenig J., *Raman spectrum of Graphite*, The Journal of Chemical Physic. 1970. 53: p. 1126-1130.
35. R. J. Nemanich, S. A. Solin, *First-and second-order Raman scattering from finite-size crystals of graphite*, Physical Review B., 1979. (20): p. 392-401.
36. Ranjit Hawaldar et al., *Large-area high-throughput synthesis of monolayer graphene sheet by Hot Filament Thermal Chemical Vapor Deposition*, Scientific Reports 2, 2012. (682): p. 1-9.
37. C. Thomsen and S. Reich, *Double Resonant Raman Scattering in Graphite*, Physical Review Letters, 2000. (85): p. 5214-5217.
38. Y. Kawashim and G. Katagiri, *Fundamentals, overtones, and combinations in the Raman spectrum of graphite*, Physical Review B Condensed Matter, 1995. 52(14): p. 10053-10059.
39. Stephanie Reich Christian and Thomsen, *Raman spectroscopy of graphite*, Phil. Trans. R. Soc. Lond. A 362 (2004) 2271-2288.
40. M. A. Pimenta, *Studying disorder in graphite-based systems by Raman spectroscopy*, Physical Chemistry Chemical Physics, 2007. (9): p. 1276-1291.
41. M. S. Dresselhaus, *Characterizing Graphene, Graphite, and Carbon Nanotubes by Raman Spectroscopy*, Annual Review of Condensed Matter Physics, 2010. (1): p. 89-108.
42. Andrea Carlo Ferrari and John Robertson, *Raman spectroscopy of amorphous, nanostructured, diamond-like carbon, and nanodiamond*, Phil. Trans. R. Soc. Lond. A 2004 362, 2477-2512.
43. A. C. Ferrari, *Raman spectroscopy of graphene and graphite: Disorder, electron-phonon coupling, doping and nonadiabatic effects*, Solid State Communications, 2007. (143): p. 47-57.
44. Guodong Jiang et al., *TiO2 nanoparticles assembled on graphene oxide nanosheets with high photocatalytic activity for removal of pollutants*, Carbon, 2011. (49): p. 2693-2701.
45. Ang Wei et al., *Synthesis of high-performance graphene nanosheets by thermal reduction of graphene oxide*, Materials Research Bulletin, 2011. (46): p 2131-2134.
46. Ramakrishna Podila, *Raman Spectroscopy of Folded and Scrolled Graphene*, ACS Nano, 2012. (6): p 5784-5790.
47. Zou, X. X. and Y. Zhang, *Noble metal-free hydrogen evolution catalysts for water splitting*. Chemical Society Reviews, 2015. 44(15): p. 5148-5180.
48. Wang, H. B., T. Maiyalagan, and X. Wang, *Review on Recent Progress in Nitrogen-Doped Graphene: Synthesis, Characterization, and Its Potential Applications*. Acs Catalysis, 2012. 2(5): p. 781-794.
49. Deng, Y. F., et al., *Review on recent advances in nitrogen-doped carbons: preparations and applications in supercapacitors*. Journal of Materials Chemistry A, 2016. 4(4): p. 1144-1173.
50. Shao, Y. Y., et al., *Nitrogen-doped carbon nanostructures and their composites as catalytic materials for proton exchange membrane fuel cell*. Applied Catalysis B-Environmental, 2008. 79(1-2): p. 89-99.
51. Zhang, J., Z. Xia, and L. Dai, *Carbon-based electrocatalysts for advanced energy conversion and storage*. Science Advances, 2015. 1(7).
52. Kumar, B., et al., *Renewable and metal-free carbon nanofibre catalysts for carbon dioxide reduction*. Nature Communications, 2013. 4.
53. Dresselhaus, M. S., A. Jorio, and R. Saito, *Characterizing Graphene, Graphite, and Carbon Nanotubes by Raman Spectroscopy*. Annual Review of Condensed Matter Physics, Vol 1, 2010. 1: p. 89-108.
54. Ferrari, A. C. and J. Robertson, *Raman spectroscopy of amorphous, nanostructured, diamond-like carbon, and nanodiamond*. Philosophical Transactions of the Royal Society a-Mathematical Physical and Engineering Sciences, 2004. 362(1824): p. 2477-2512.
55. Zhang, C. H., et al., *Synthesis of Nitrogen-Doped Graphene Using Embedded Carbon and Nitrogen Sources.* Advanced Materials, 2011. 23(8): p. 1020-1024.
56. Lv, R., et al., *Nitrogen-doped graphene: beyond single substitution and enhanced molecular sensing.* Scientific Reports, 2012. 2.

It will be understood that various details of the presently-disclosed subject matter can be changed without departing from the scope of the subject matter disclosed herein. Furthermore, the foregoing description is for the purpose of illustration only, and not for the purpose of limitation.

What is claimed is:

1. A method for synthesizing a carbon nanocage, comprising:
forming a solution including a metal salt and an organic carbon source;
drying the solution to obtain a precursor powder;
annealing the precursor powder in a carrier gas or a vacuum at a temperature of about 450° C. to about 700° C. for a time period of about 1 minute to about 20 minutes to obtain a nanocage including a metal nanoparticle surrounded by a carbon shell, wherein the nanocage has a size of about 2 nm to about 100 nm.

2. The method of claim 1, further comprising the step of removing the metal nanoparticle from the carbon shell.

3. The method of claim 2, wherein the step of removing the metal nanoparticle from the carbon shell comprises applying an inorganic acid solution to the nanocage.

4. The method of claim 3, wherein the inorganic acid solution comprises a nitric acid solution.

5. The method of claim 1, wherein the metal salt is a transition metal salt.

6. The method of claim 5, wherein the transition metal is selected from the group consisting of iron, copper, cobalt, molybdenum, manganese, and nickel.

7. The method of claim 6, wherein the transition metal is nickel.

8. The method of claim 1, wherein the solution is an aqueous solution.

9. The method of claim 1, wherein the solution comprises an equal weight ratio of the metal salt and the organic carbon source.

10. The method of claim 1, wherein the step of drying the solution comprises drying the solution at a temperature of between about 60° C. to about 120° C.

11. The method of claim 1, wherein the organic carbon source is citric acid.

12. The method of claim 1, wherein the step of annealing the precursor powder comprises placing the precursor powder in a furnace.

13. The method of claim 1, wherein the carrier gas is oxygen-free.

14. The method of claim 13, wherein the carrier gas is selected from Are, $H_2$, helium, neon, xenon, $N_2$, or a combination thereof.

15. The method of claim 1, wherein the nanocage is spherical.

16. The method of claim 1, wherein the organic carbon source comprises a nitrogen-containing alkaloid, an amide, or a nitrogen-containing heterocycle.

17. The method of claim 16, wherein the amide is selected from urea and acetaminophen.

18. The method of claim 16, wherein the nitrogen-containing alkaloid is a purine.

19. The method of claim 18, wherein the purine is caffeine or theophylline.

20. The method of claim 16, wherein the nitrogen-containing heterocycle is selected from the group consisting of a diazine, a triazine, and hydrolyzed acids thereof.

21. The method of claim 16, wherein the nanocage is a N-doped carbon nanocage.

22. The method of claim 1, wherein the solution comprises a weight ratio of organic carbon source to metal salt of about 10:1 to about 1:10.

23. The method of claim 1, wherein the step of annealing the precursor powder is performed at a temperature of about 500° C. to about 600° C.

24. A method for synthesizing a carbon nanocage, comprising: forming a solution including a metal salt and an organic carbon source; drying the solution to obtain a precursor powder; annealing the precursor powder in a carrier gas or a vacuum at a temperature of about 450° C. to about 700° C. for a time period of about 1 minute to about 20 minutes to obtain a nanocage including a metal nanoparticle surrounded by a carbon shell, wherein the step of annealing the precursor powder comprises annealing the precursor powder at a temperature of 600° C. for about 10 minutes.

25. A method for synthesizing a carbon nanocage, comprising: forming a solution including a metal salt and an organic carbon source; drying the solution to obtain a precursor powder; annealing the precursor powder in a carrier gas or a vacuum at a temperature of about 450° C. to about 700° C. for a time period of about 1 minute to about 20 minutes to obtain a nanocage including a metal nanoparticle surrounded by a carbon shell, wherein the nanocage has a diameter of about 3 nm.

26. A method for synthesizing a carbon nanocage, comprising: forming a solution including a metal salt and an organic carbon source; drying the solution to obtain a precursor powder; annealing the precursor powder in a carrier gas or a vacuum at a temperature of about 450° C. to about 700° C. for a time period of about 1 minute to about 20 minutes to obtain a nanocage including a metal nanoparticle surrounded by a carbon shell, wherein the nanocage has a wall thickness of about 2 or about 3 layers.

27. A method for synthesizing a carbon nanocage, comprising: forming a solution including a metal salt and an organic carbon source; drying the solution to obtain a precursor powder; annealing the precursor powder in a carrier gas or a vacuum at a temperature of about 450° C. to about 700° C. for a time period of about 1 minute to about 20 minutes to obtain a nanocage including a metal nanoparticle surrounded by a carbon shell, wherein the nanocage has a Brunauer-Emmett-Teller (BET) surface area of about 980 to about 1150 $m^2g^{-1}$.

28. A method for synthesizing a carbon nanocage, comprising: forming a solution including a metal salt and an organic carbon source; drying the solution to obtain a precursor powder; annealing the precursor powder in a carrier gas or a vacuum at a temperature of about 450° C. to about 700° C. for a time period of about 1 minute to about 20 minutes to obtain a nanocage including a metal nanoparticle surrounded by a carbon shell, wherein the carbon shell has a shell thickness of about 1 nm.

29. A method for synthesizing a carbon nanocage, comprising: forming a solution including a metal salt and an organic carbon source; drying the solution to obtain a precursor powder; annealing the precursor powder in a carrier gas or a vacuum at a temperature of about 450° C. to about 700° C. for a time period of about 1 minute to about 20 minutes to obtain a nanocage including a metal nanoparticle surrounded by a carbon shell, wherein the nanocage has a mono-modal pore distribution of about 2.5 nm.

30. A method for synthesizing a carbon nanocage, comprising: forming a solution including a metal salt and an organic carbon source; drying the solution to obtain a precursor powder; annealing the precursor powder in a carrier gas or a vacuum to obtain a nanocage including a metal nanoparticle surrounded by a carbon shell, wherein the organic carbon source comprises a nitrogen-containing alkaloid, an amide, or a nitrogen-containing heterocycle, wherein the nanocage is a N-doped carbon nanocage, and wherein the N-doped nanocage has an average size of about 7 nm.

31. The method of claim 21, wherein the nanocage further comprises one or more co-dopants.

32. The method of claim 31, wherein the one or more co-dopants are selected from sulfur, phosphorus, and boron.

* * * * *